Jan. 9, 1934. J. F. GAIL 1,942,420
MACHINE FOR ASSEMBLING MATTRESS TUFTS AND TUFTING CORDS
Filed July 9, 1930 29 Sheets-Sheet 9
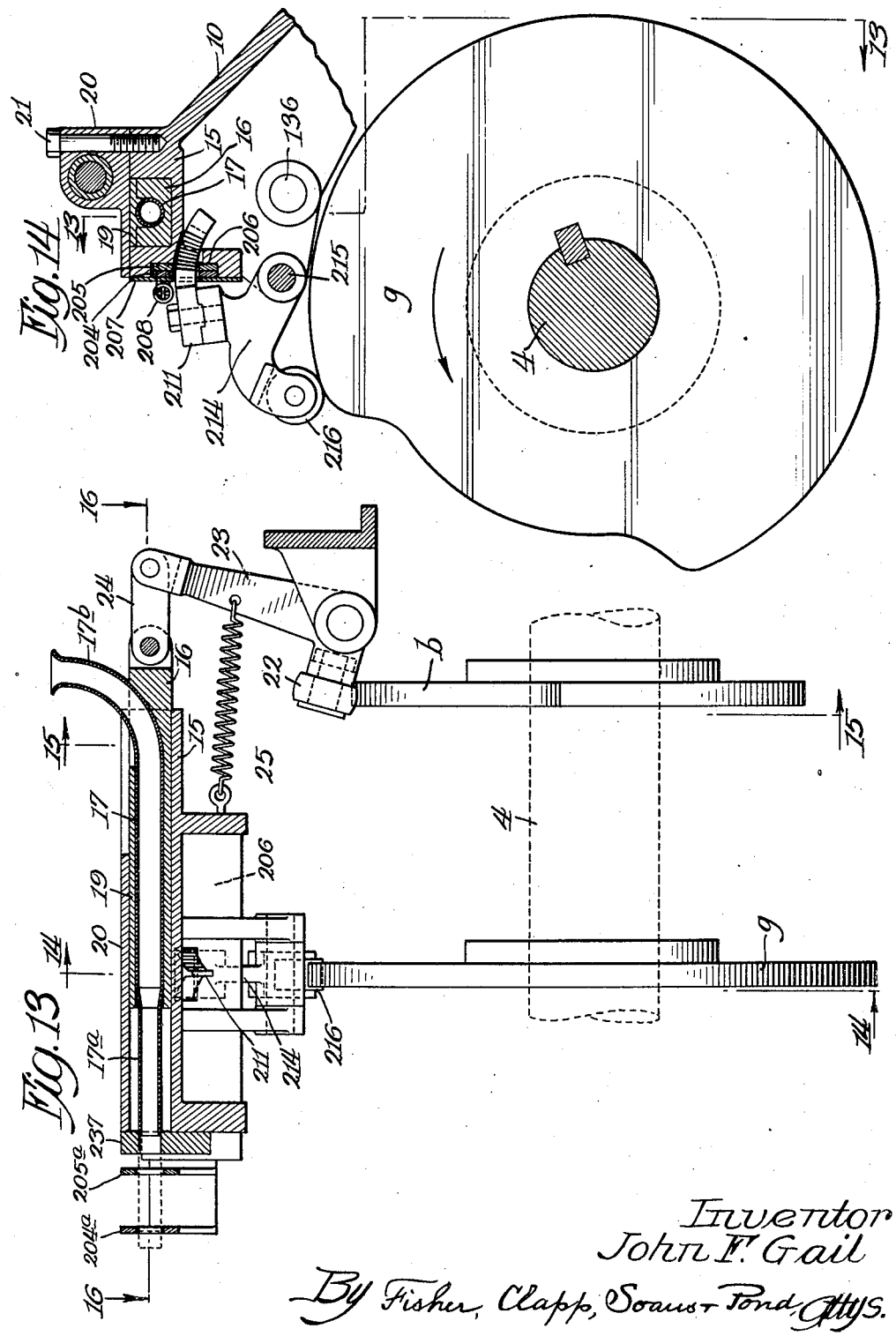
Inventor
John F. Gail
By Fisher, Clapp, Soans + Pond Attys.

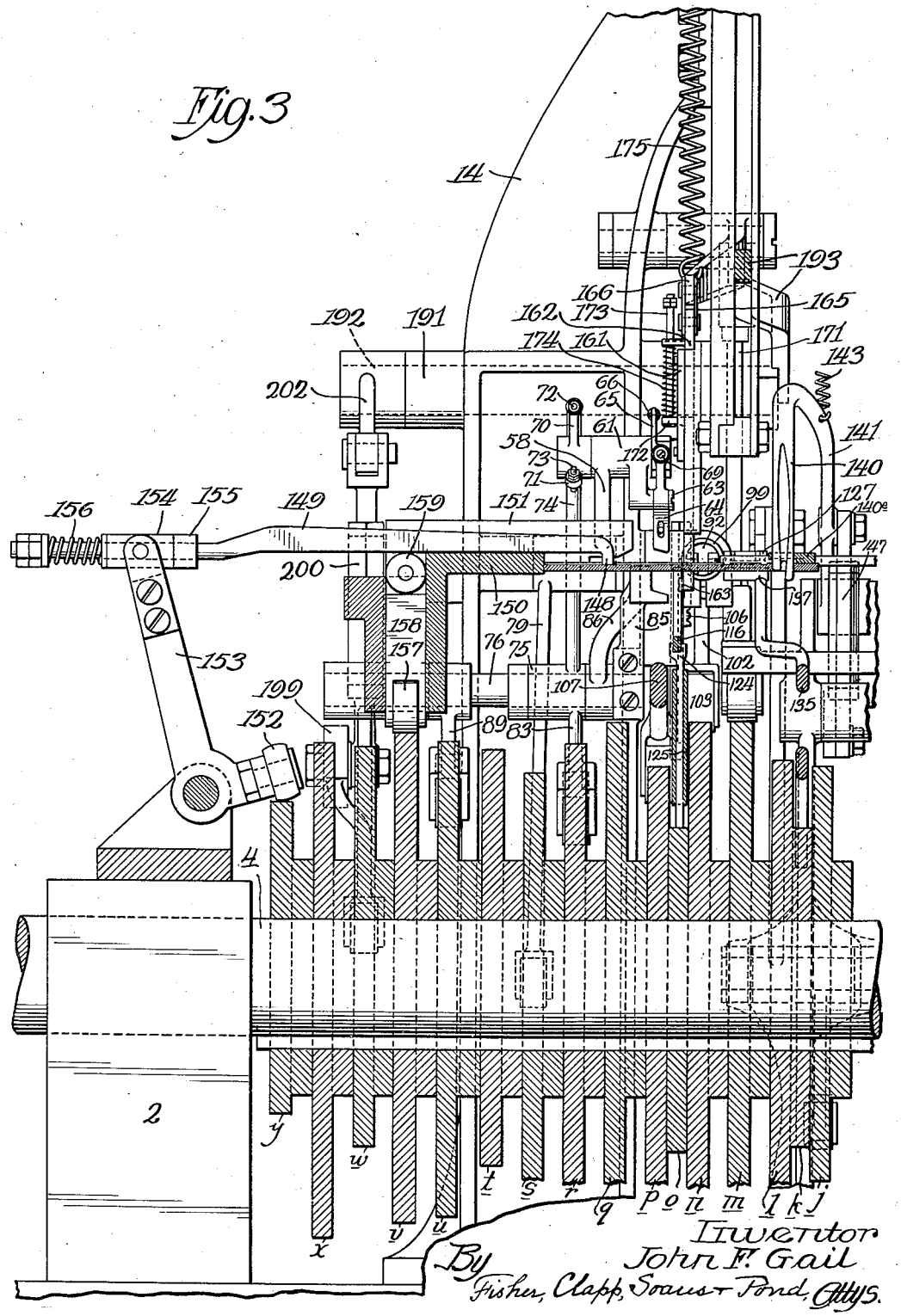

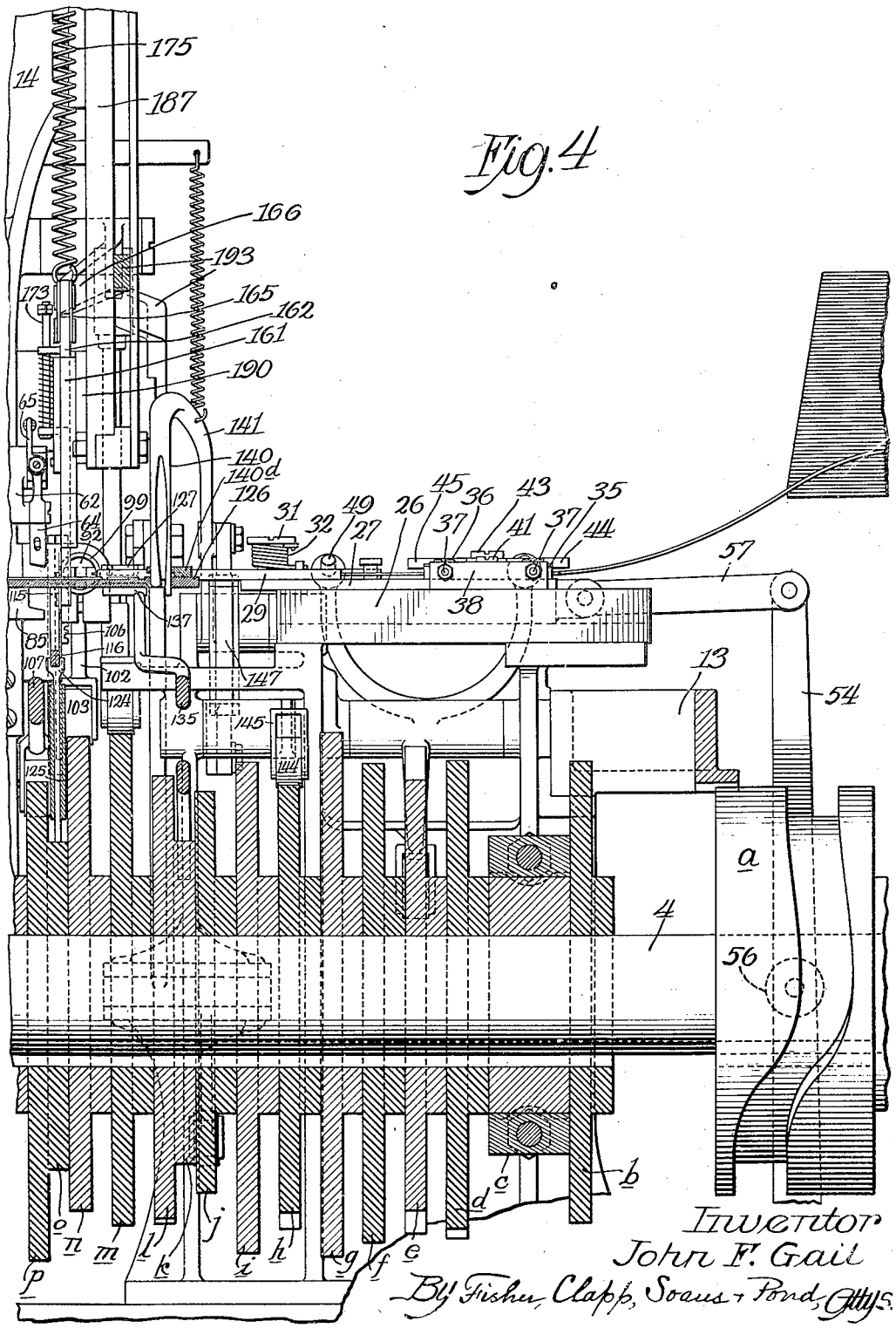

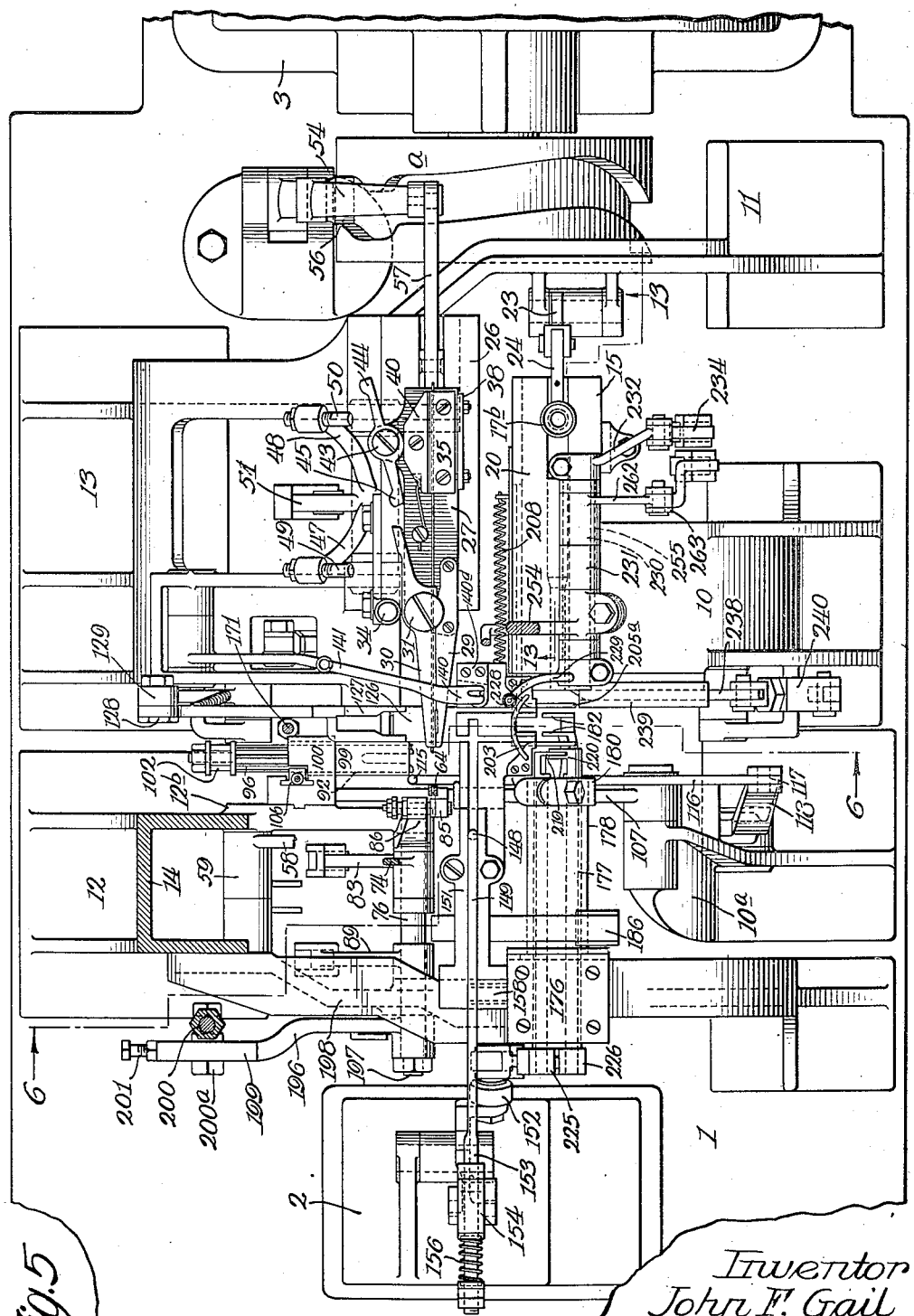

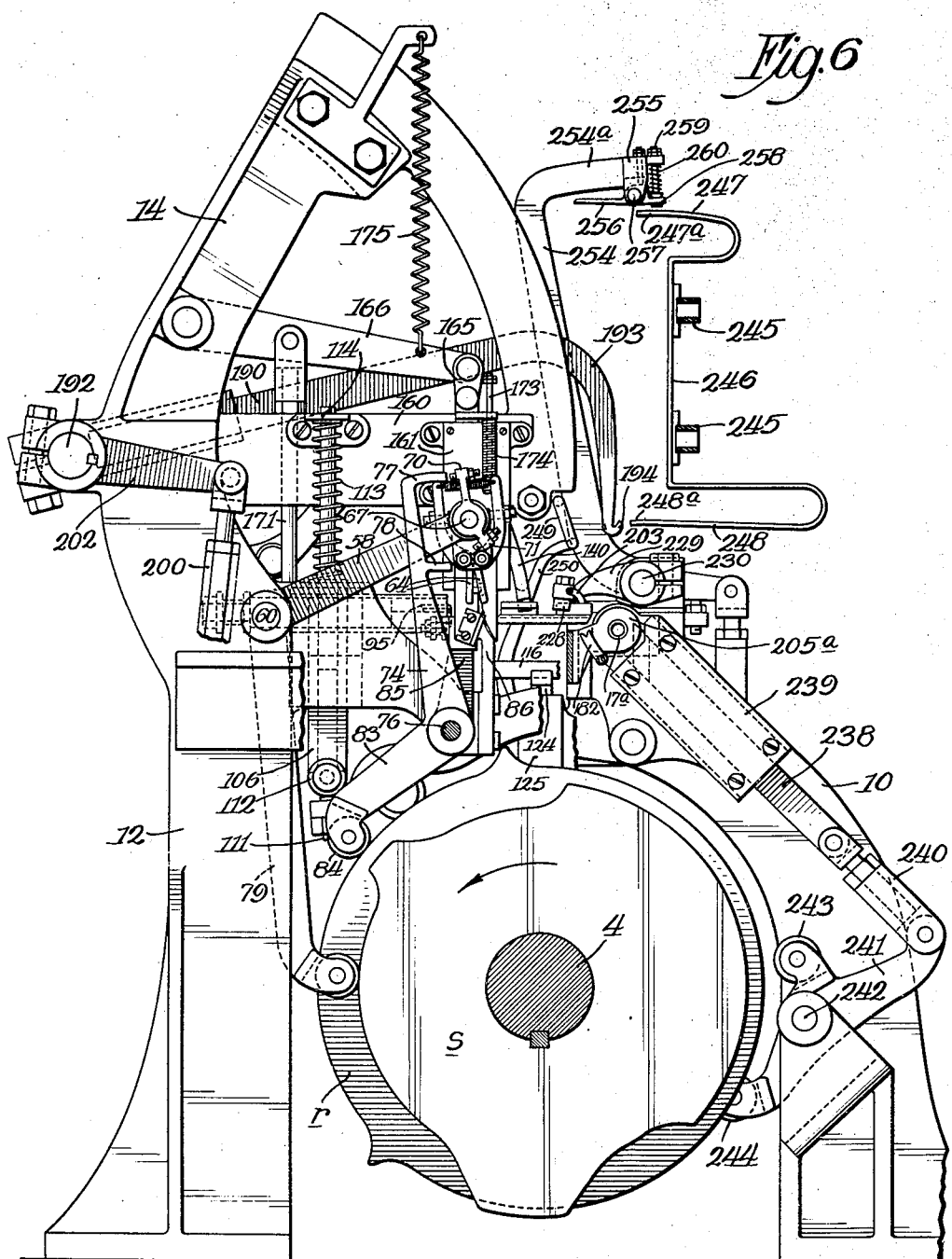

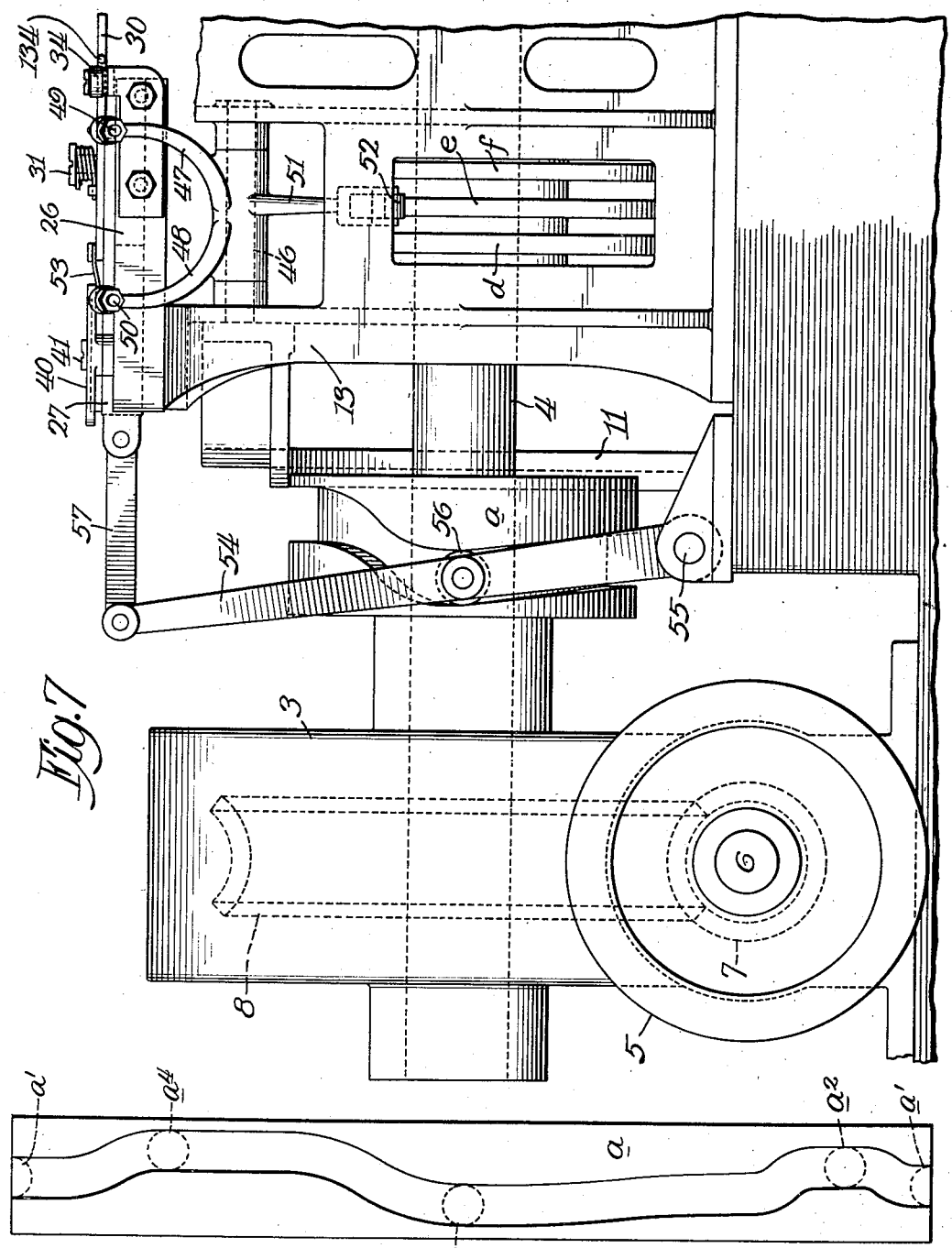

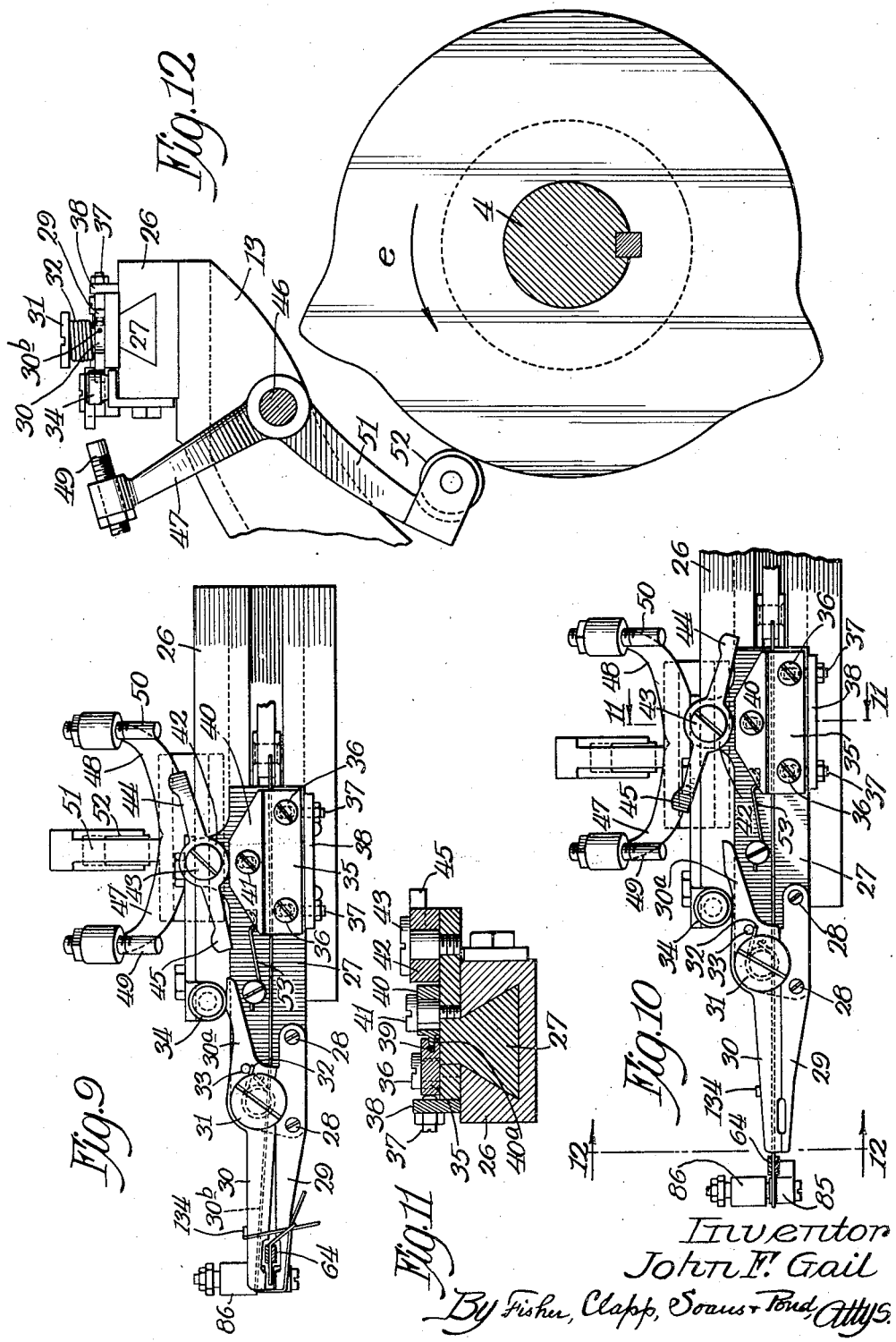

Jan. 9, 1934.  J. F. GAIL  1,942,420
MACHINE FOR ASSEMBLING MATTRESS TUFTS AND TUFTING CORDS
Filed July 9, 1930  29 Sheets-Sheet 10
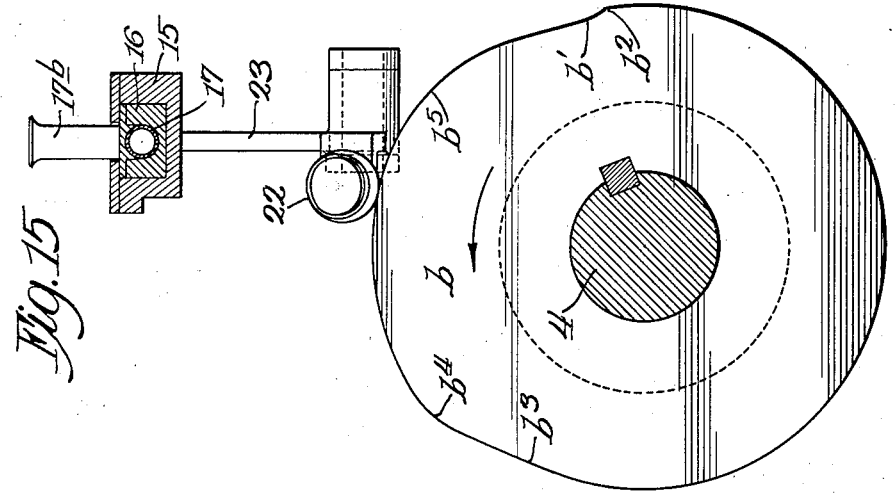
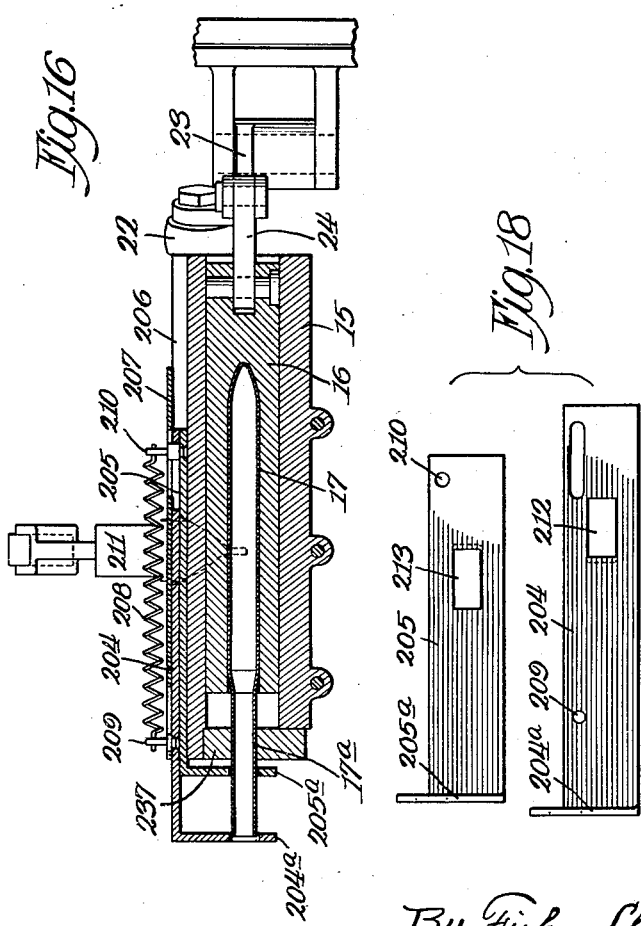
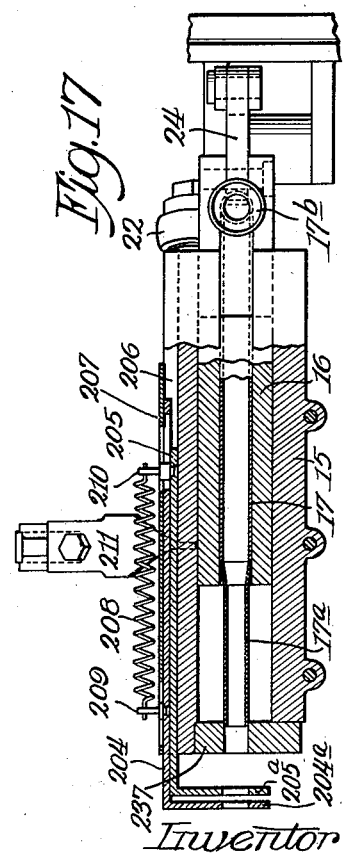
Inventor
John F. Gail
By Fisher, Clapp, Soans & Pond Attys.

Jan. 9, 1934. J. F. GAIL 1,942,420
MACHINE FOR ASSEMBLING MATTRESS TUFTS AND TUFTING CORDS
Filed July 9, 1930 29 Sheets-Sheet 11
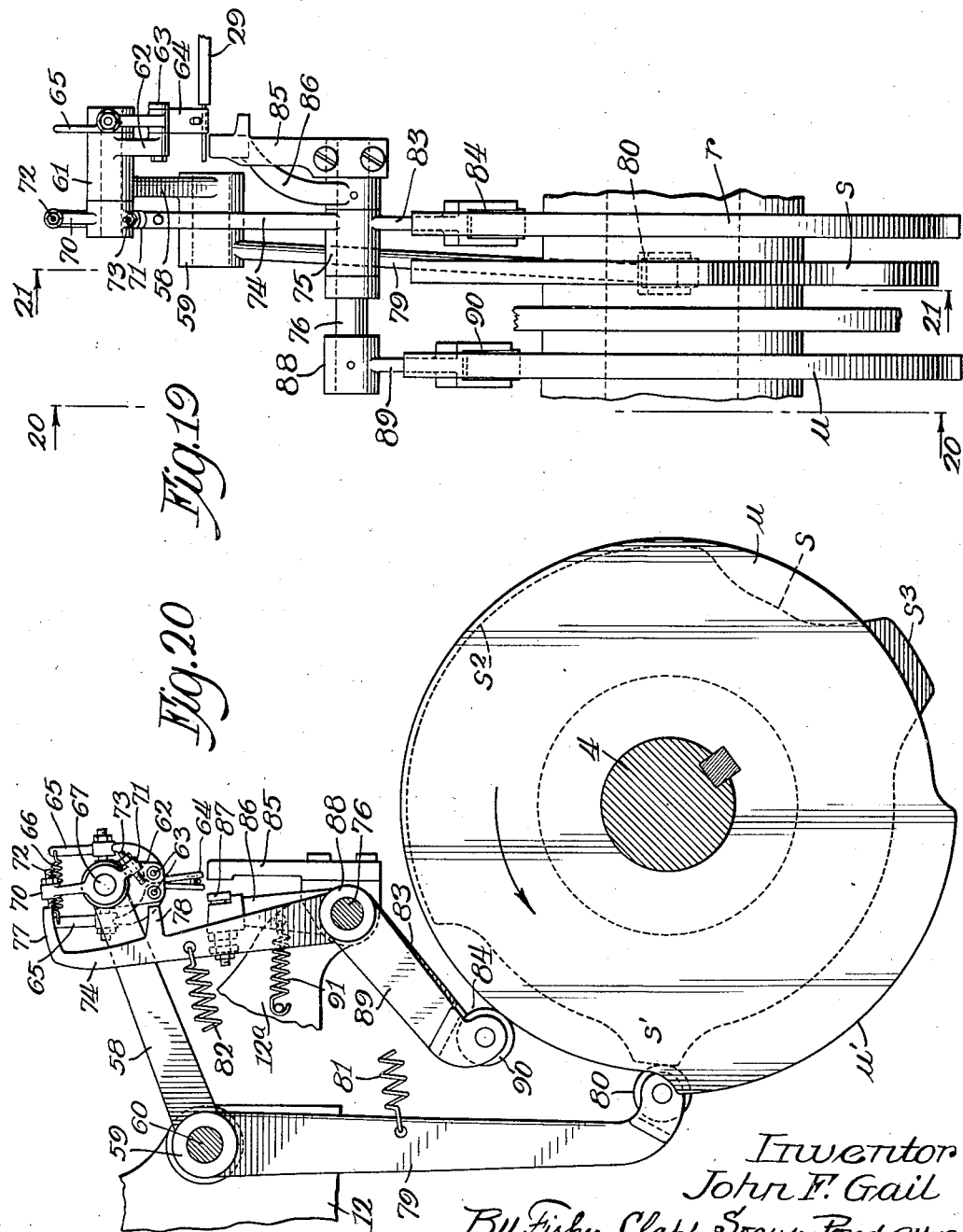

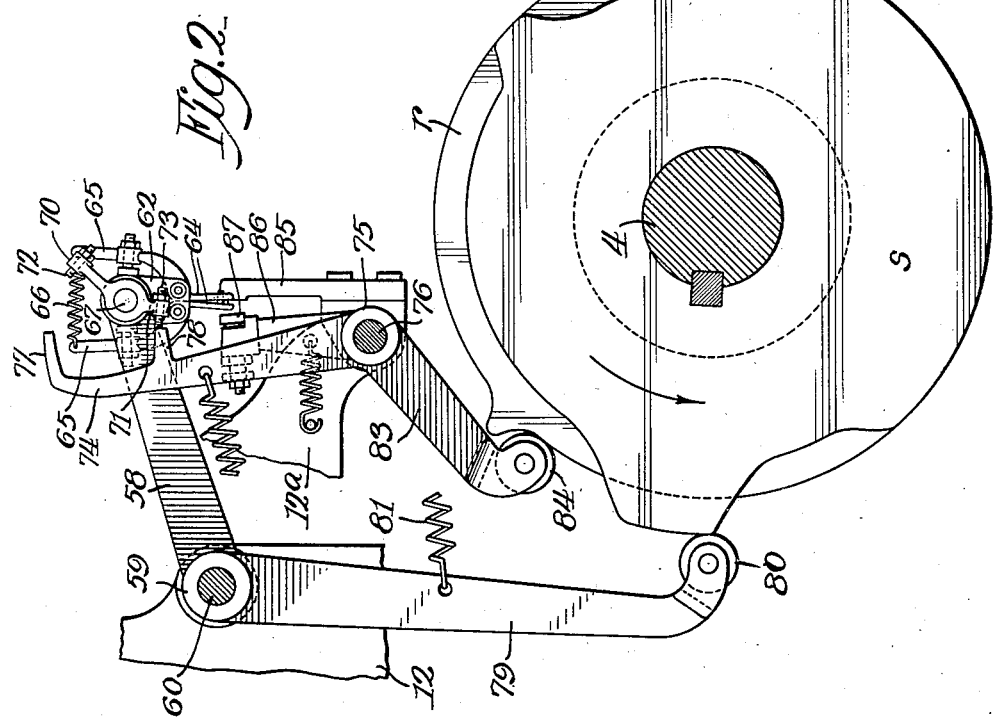

Jan. 9, 1934.  J. F. GAIL  1,942,420
MACHINE FOR ASSEMBLING MATTRESS TUFTS AND TUFTING CORDS
Filed July 9, 1930  29 Sheets-Sheet 13
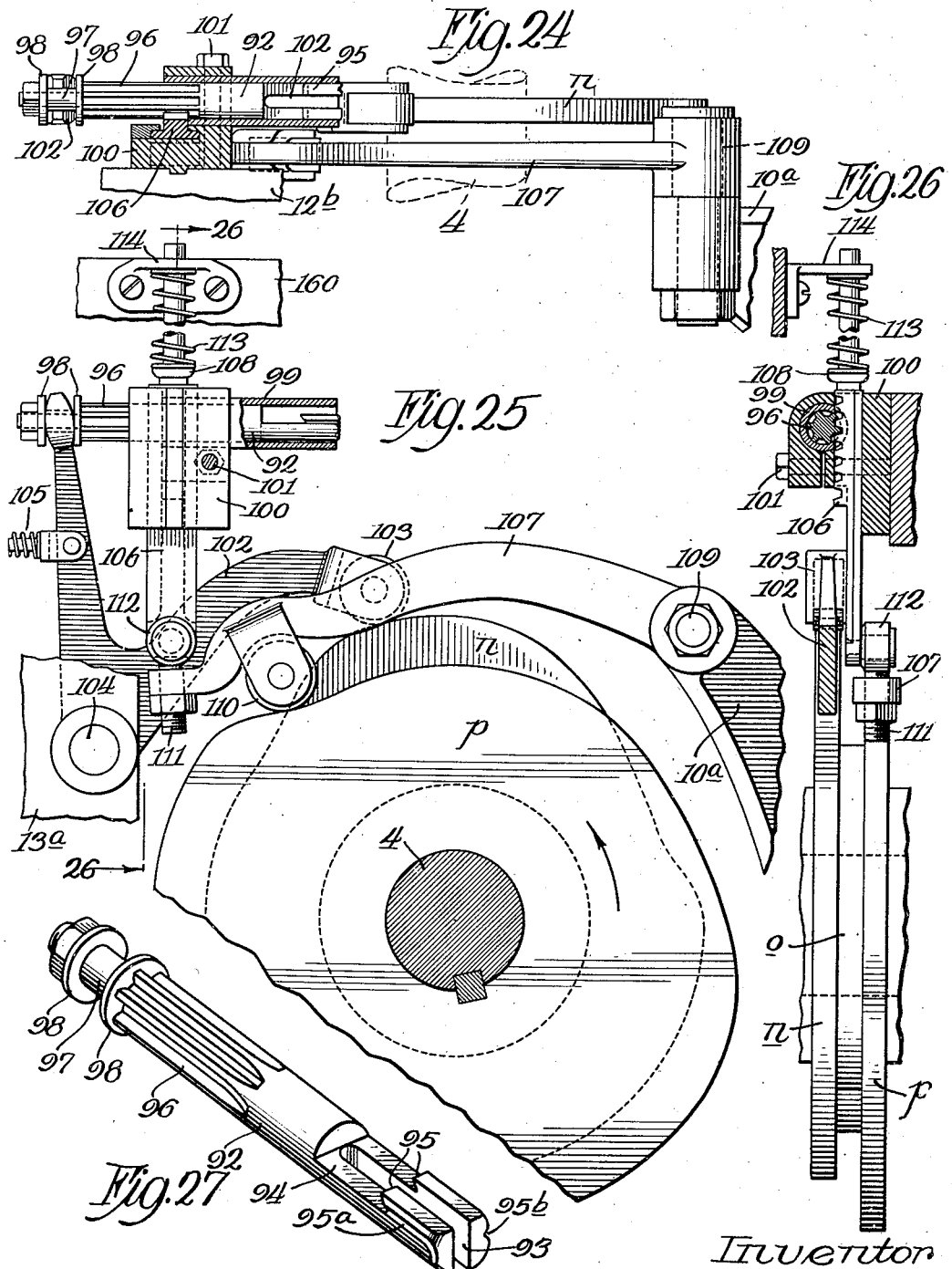
Inventor
John F. Gail
By Fisher, Clapp, Soans & Pond, Attys.

Jan. 9, 1934.    J. F. GAIL    1,942,420
MACHINE FOR ASSEMBLING MATTRESS TUFTS AND TUFTING CORDS
Filed July 9, 1930    29 Sheets-Sheet 14
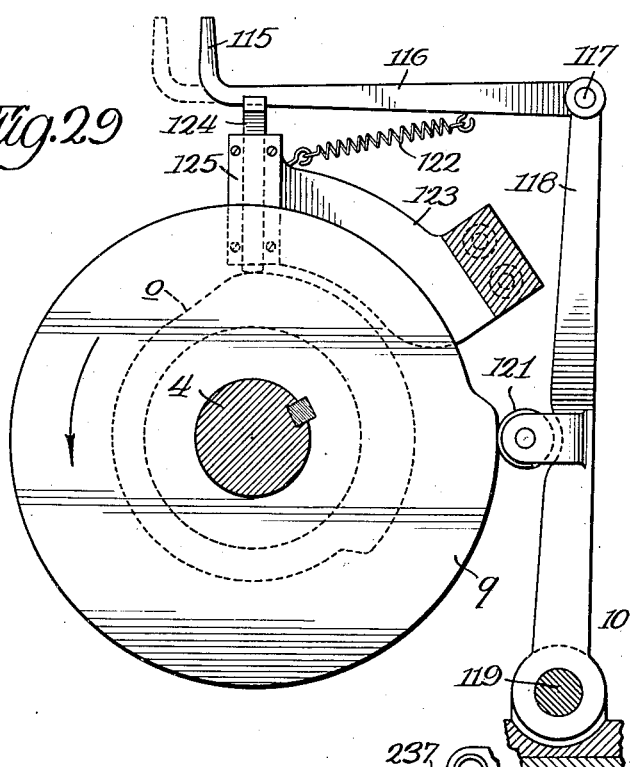
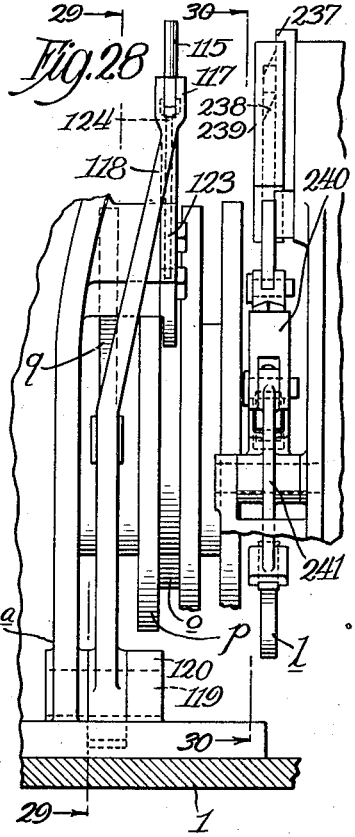
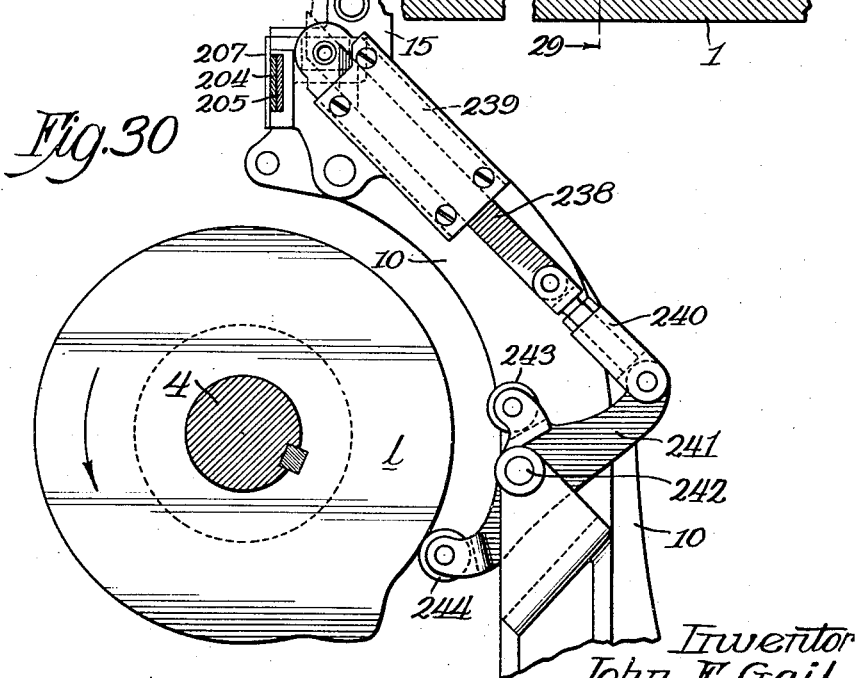
Inventor
John F. Gail
By Fisher, Clapp, Soans & Pond, Attys.

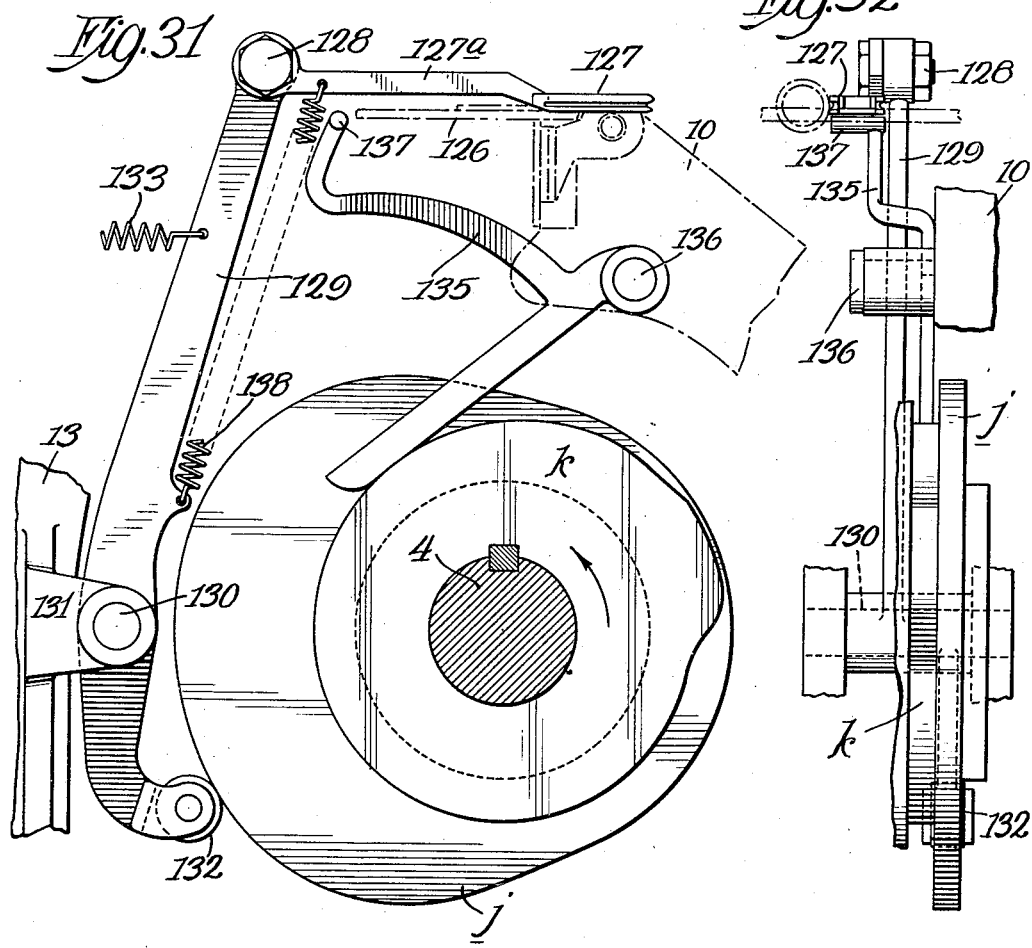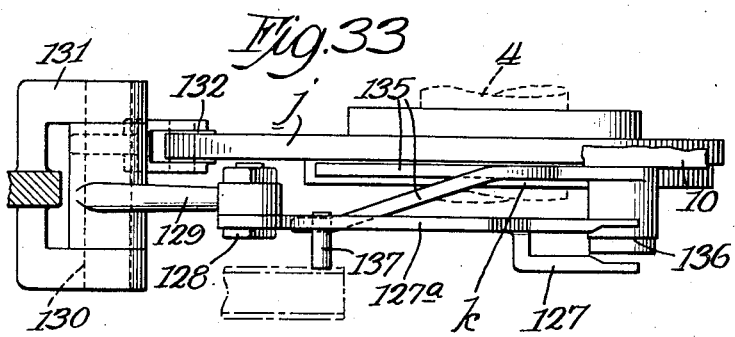

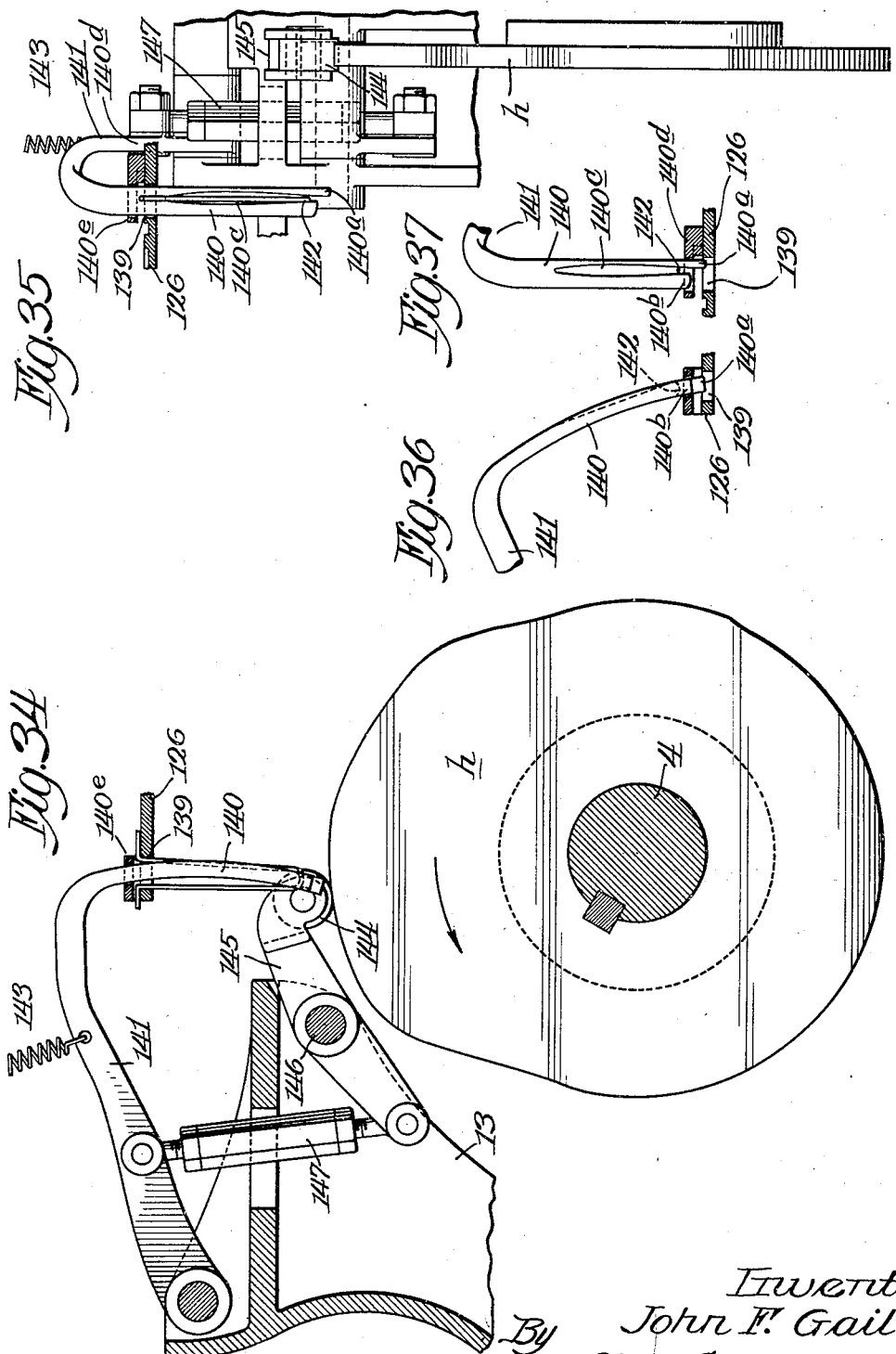

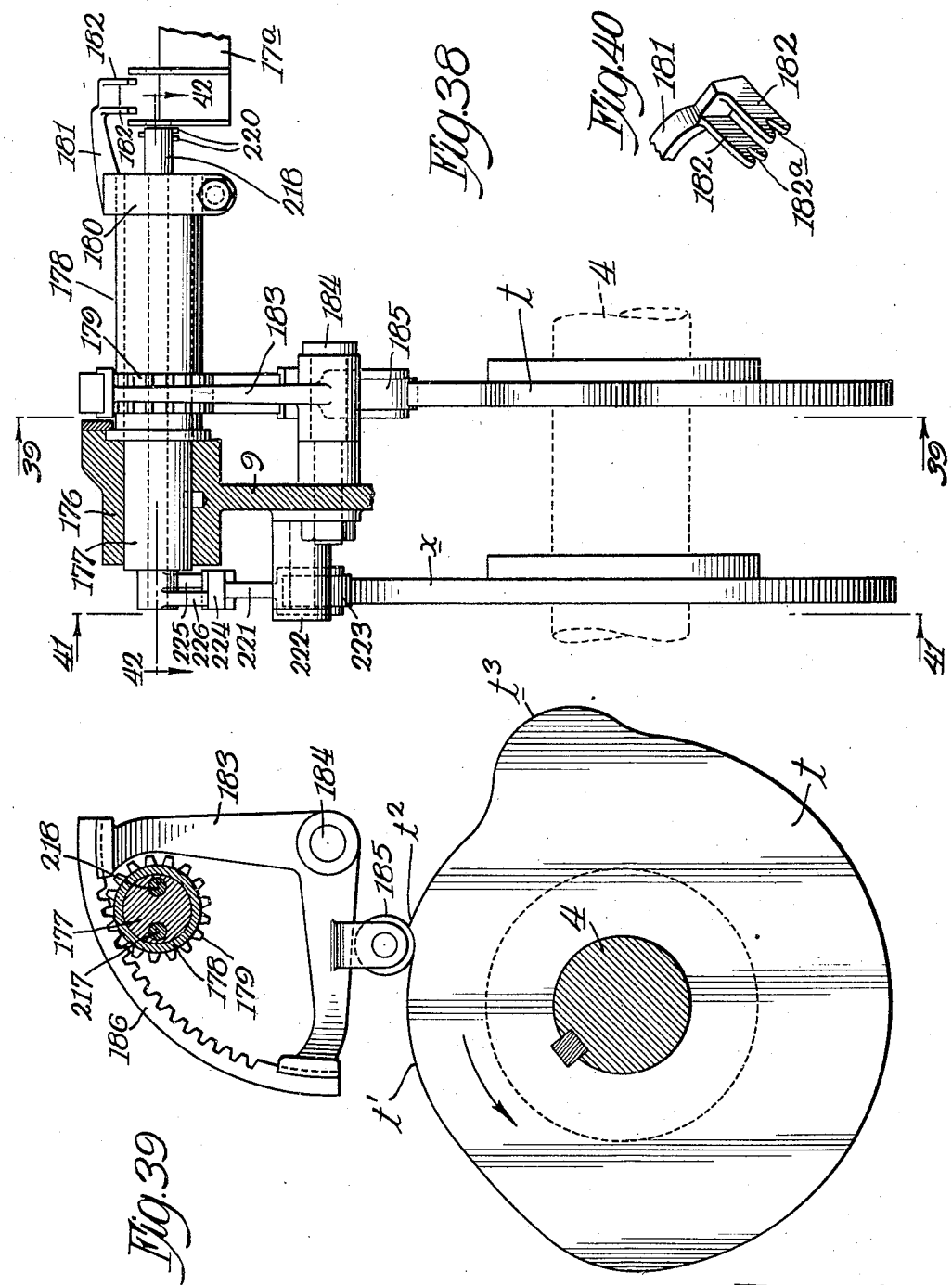

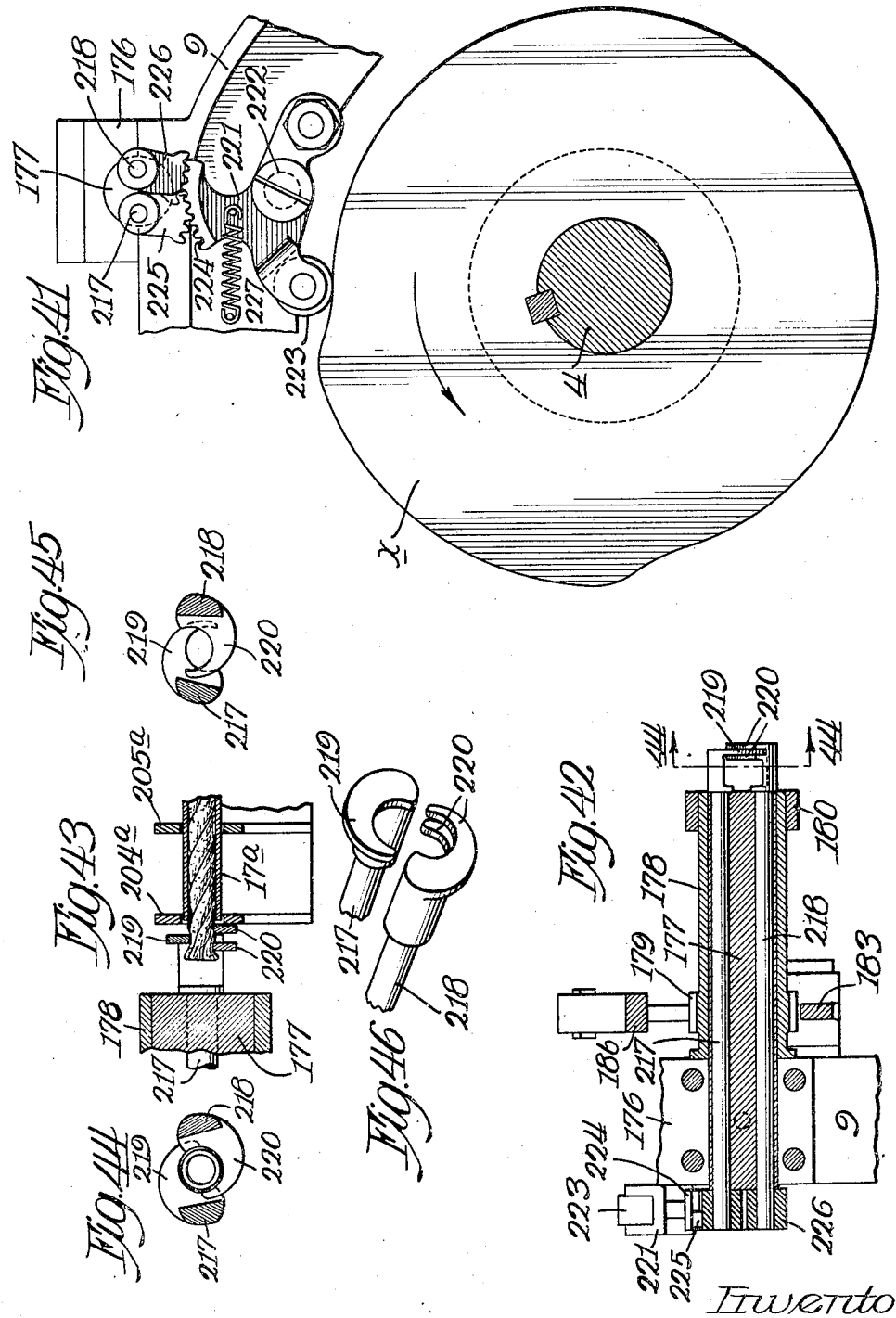

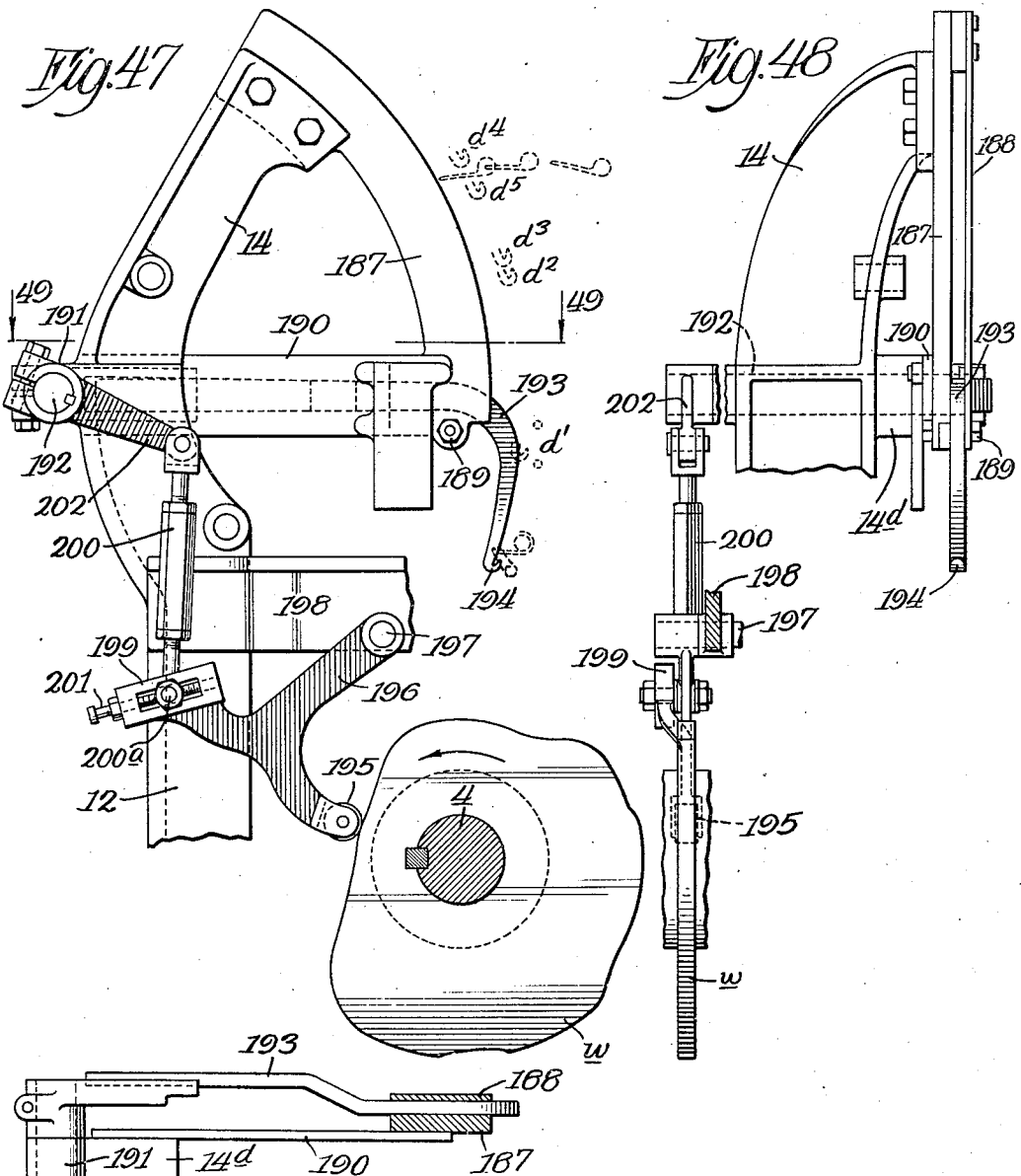

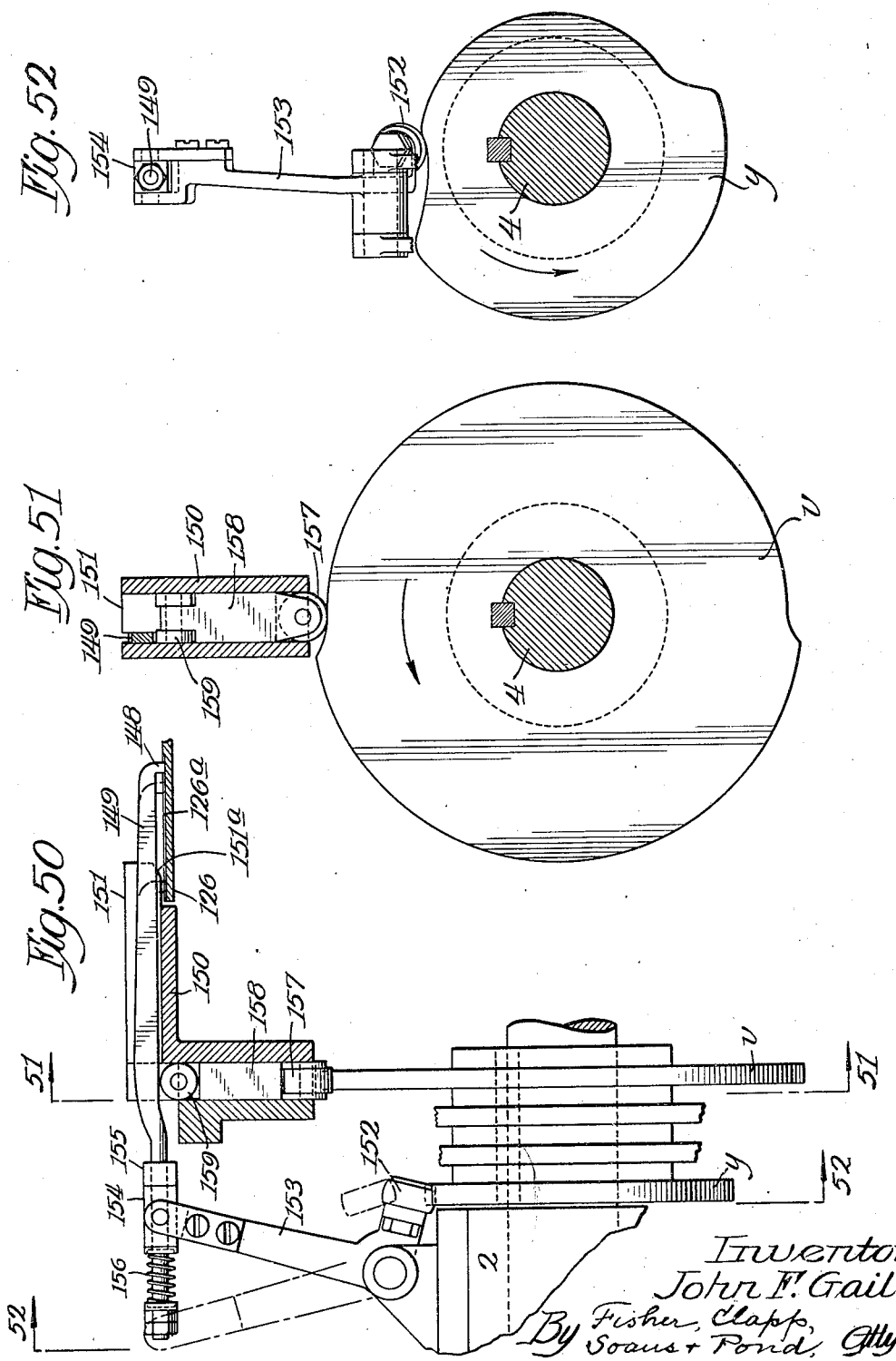

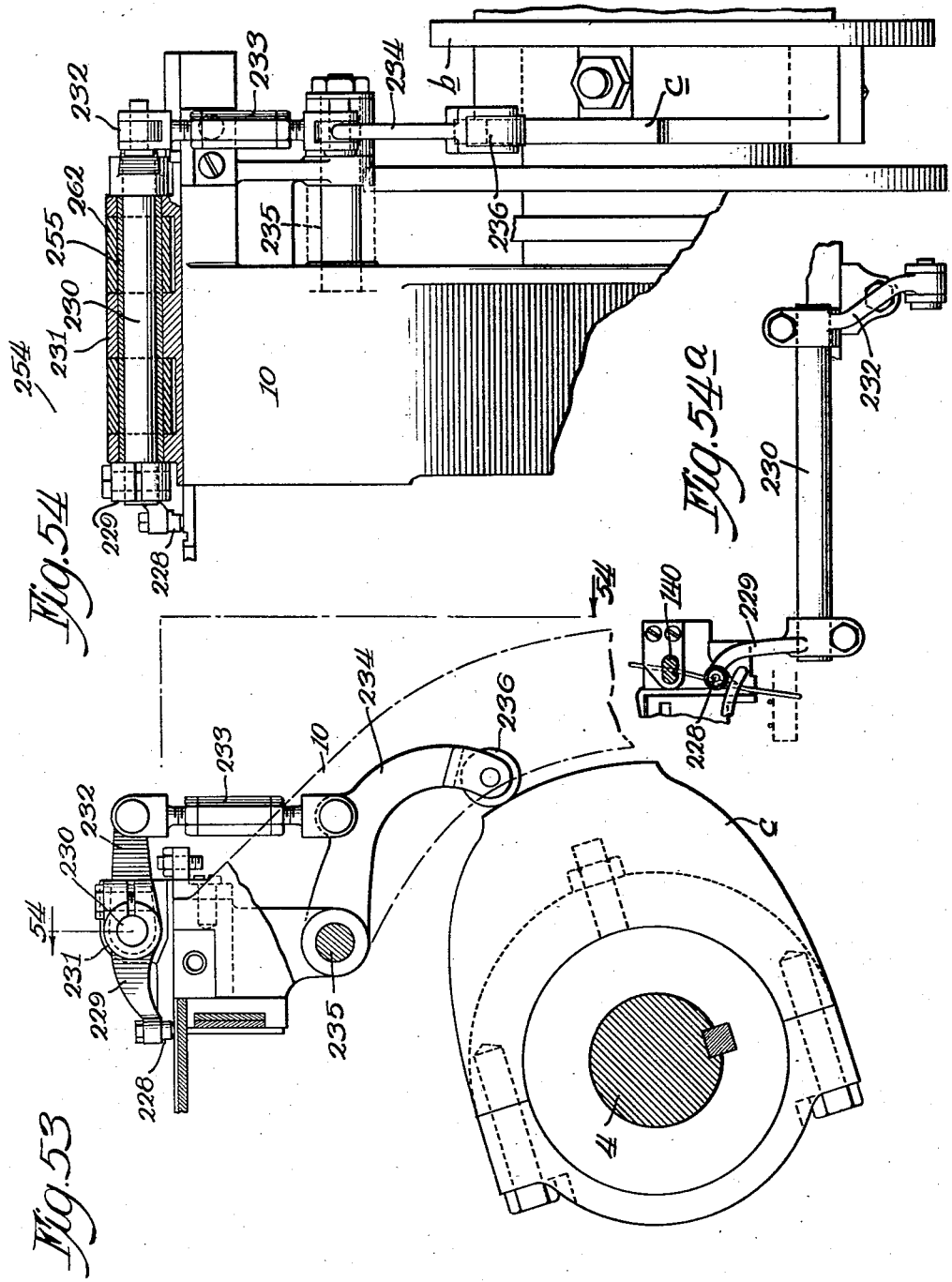

Jan. 9, 1934. J. F. GAIL 1,942,420
MACHINE FOR ASSEMBLING MATTRESS TUFTS AND TUFTING CORDS
Filed July 9, 1930 29 Sheets-Sheet 22
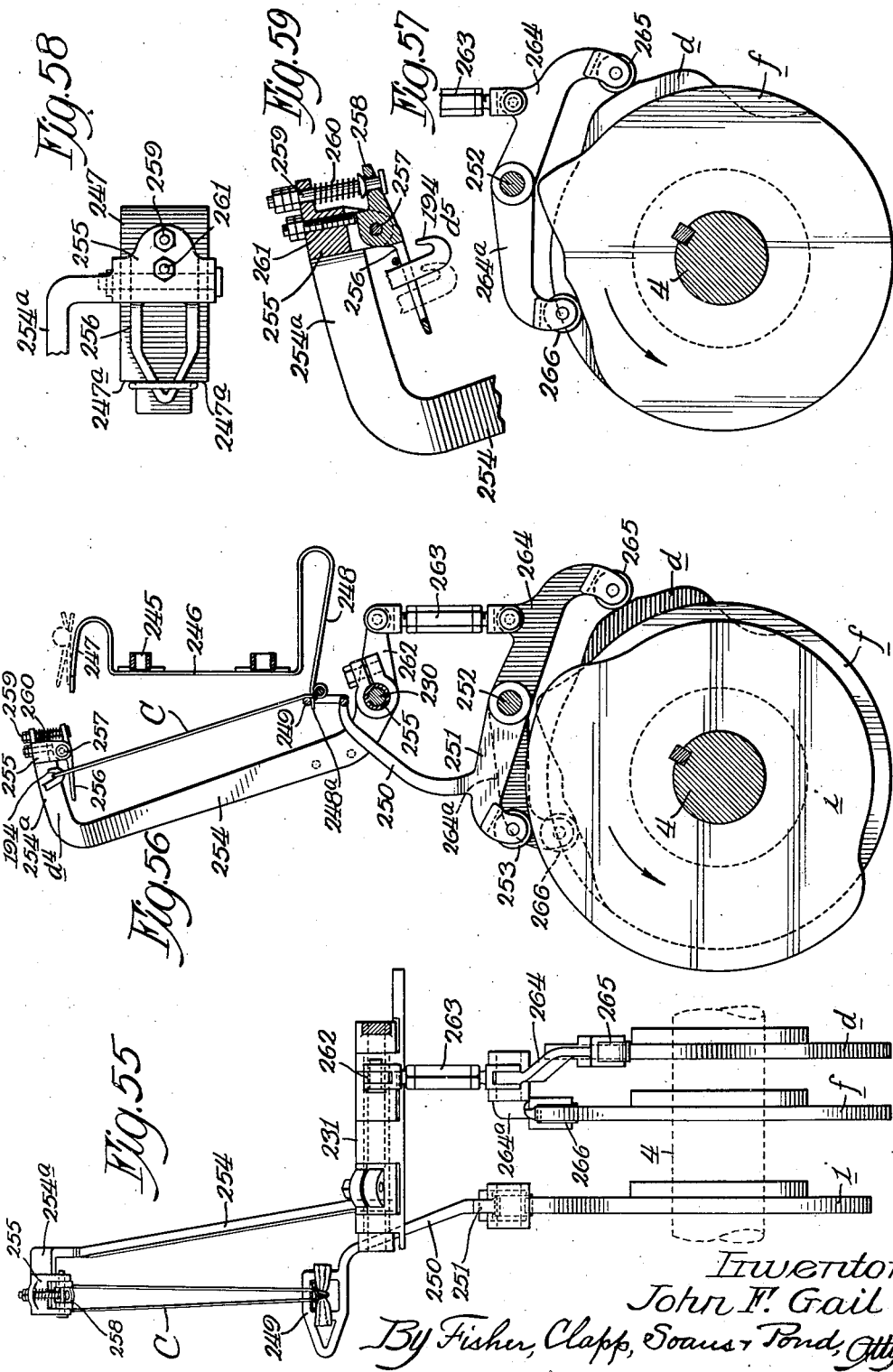
Inventor
John F. Gail
By Fisher, Clapp, Soans & Pond, Attys.

Jan. 9, 1934.    J. F. GAIL    1,942,420
MACHINE FOR ASSEMBLING MATTRESS TUFTS AND TUFTING CORDS
Filed July 9, 1930    29 Sheets-Sheet 23
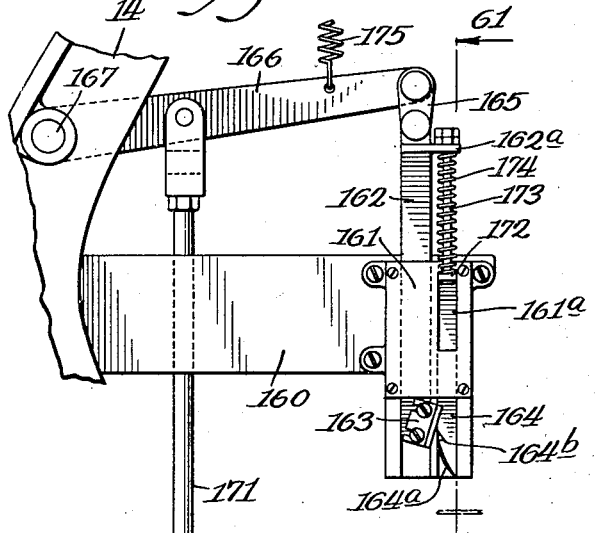
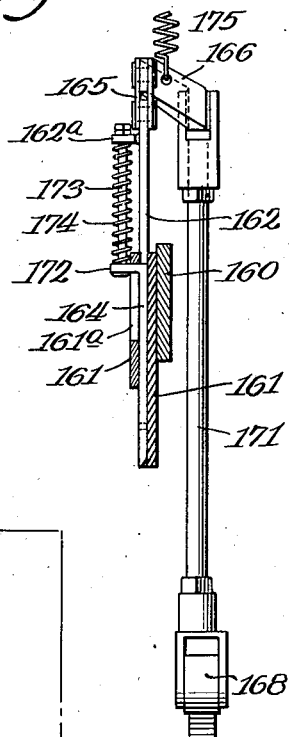
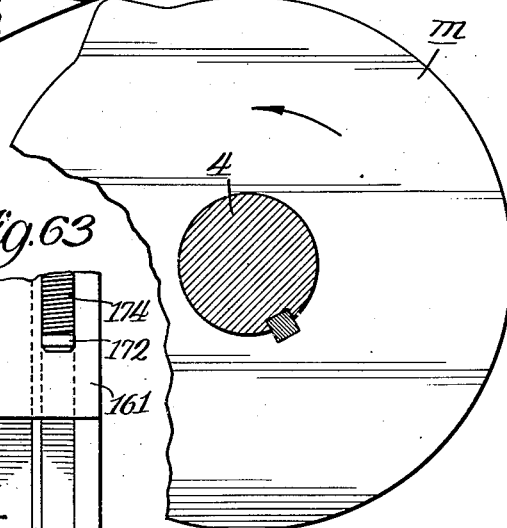
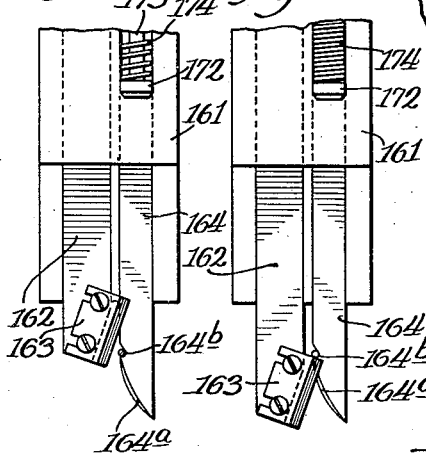
Inventor
John F. Gail
By Fisher, Clapp, Soans + Pond, Attys.

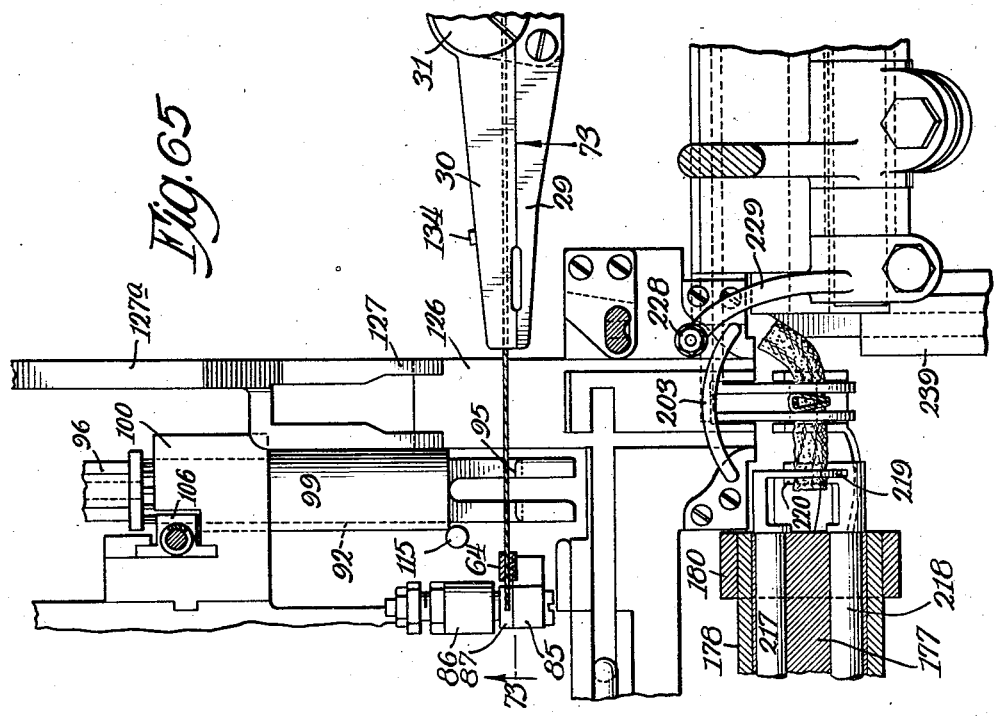
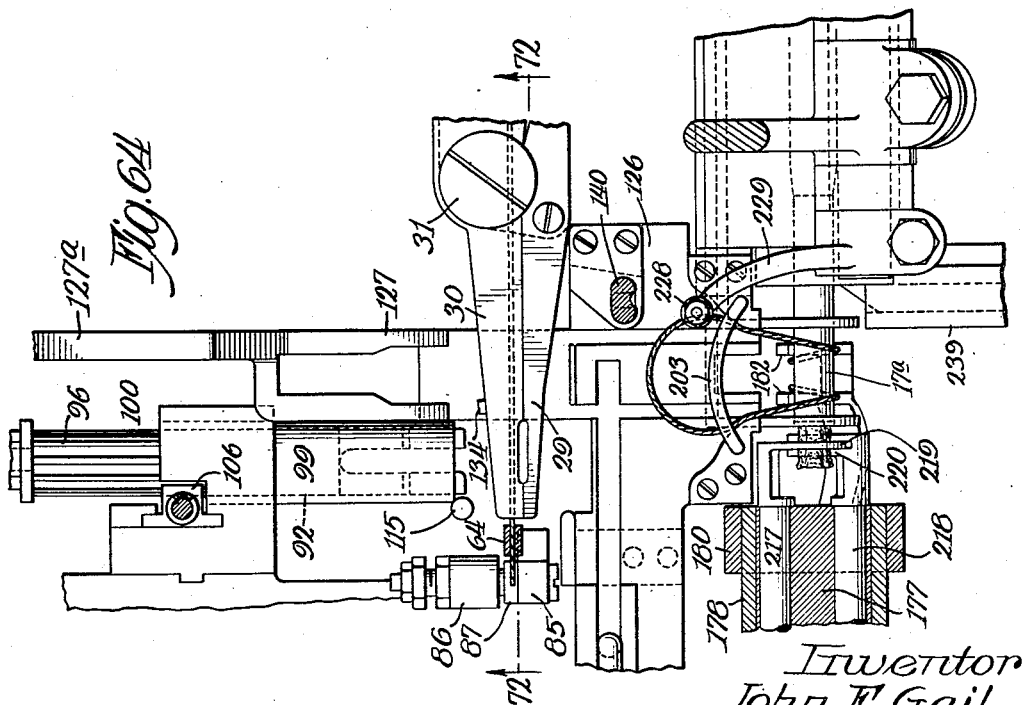

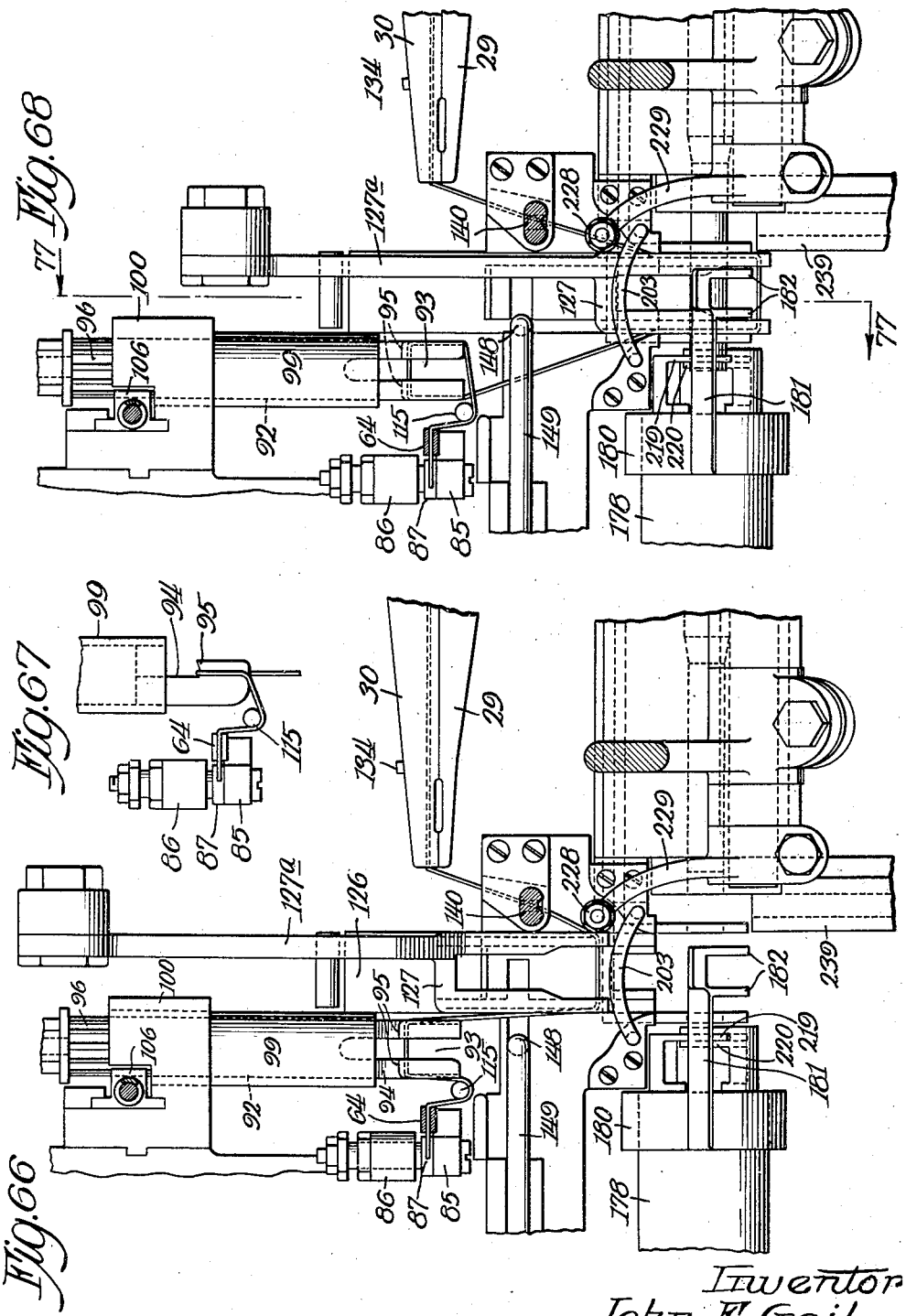

Jan. 9, 1934. J. F. GAIL 1,942,420
MACHINE FOR ASSEMBLING MATTRESS TUFTS AND TUFTING CORDS
Filed July 9, 1930 29 Sheets-Sheet 26
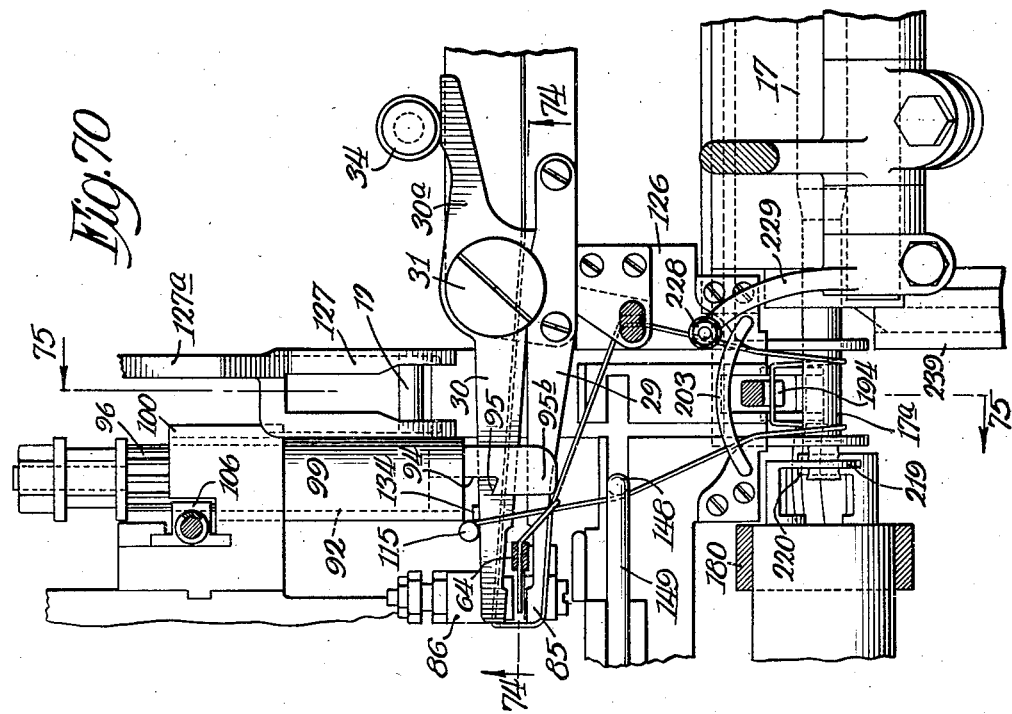
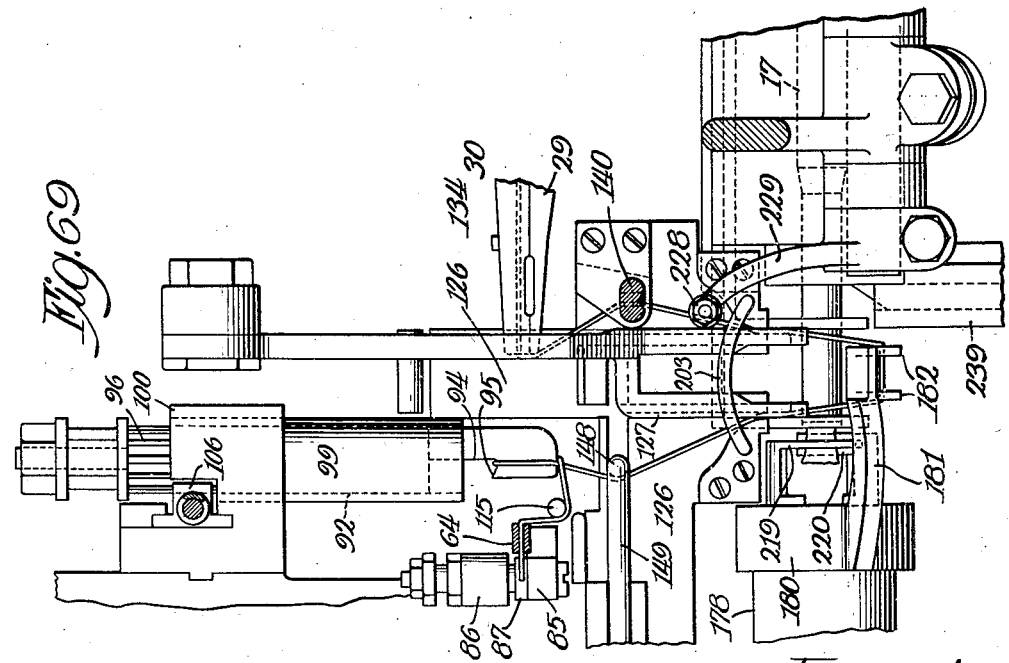
Inventor
John F. Gail
By Fisher, Clapp, Soans & Pond Attys.

Jan. 9, 1934.    J. F. GAIL    1,942,420
MACHINE FOR ASSEMBLING MATTRESS TUFTS AND TUFTING CORDS
Filed July 9, 1930    29 Sheets-Sheet 27
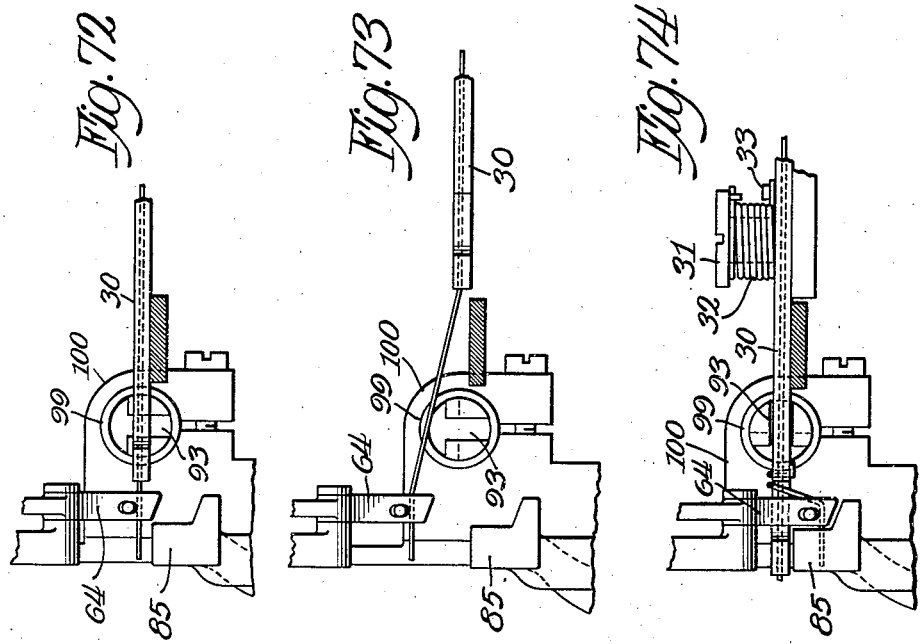
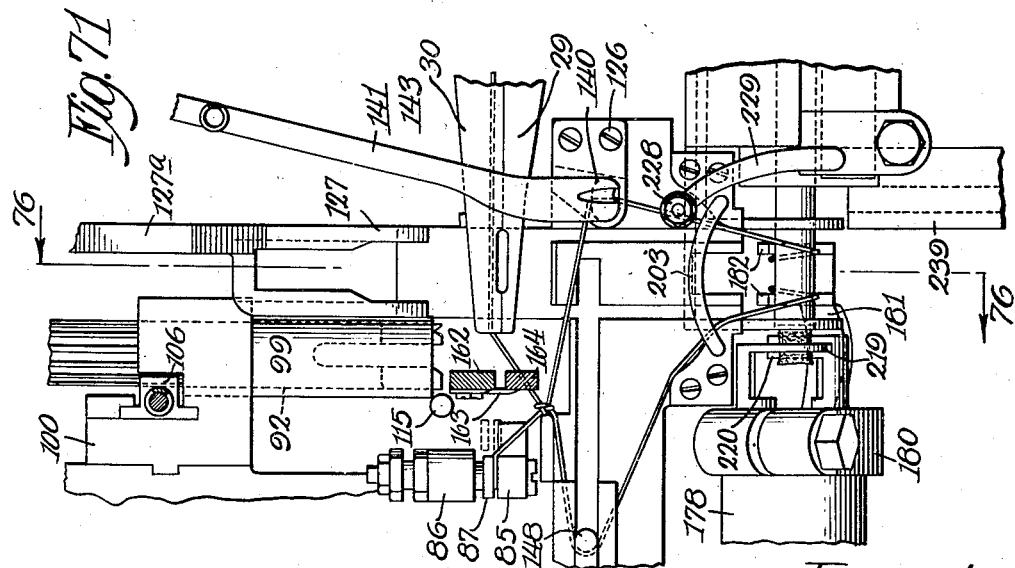
Inventor
John F. Gail
By Fisher, Clapp, Soans & Pond, Attys.

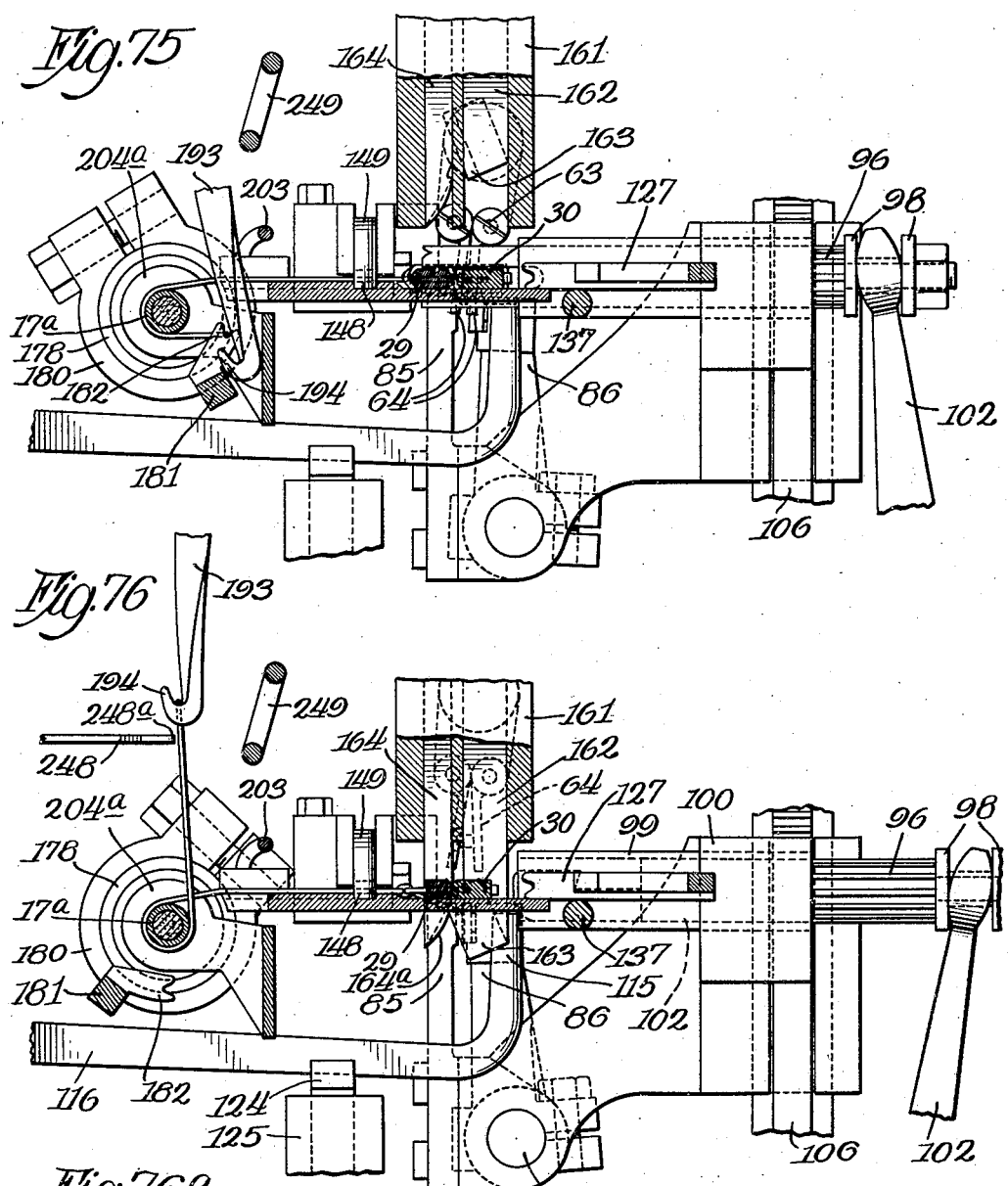
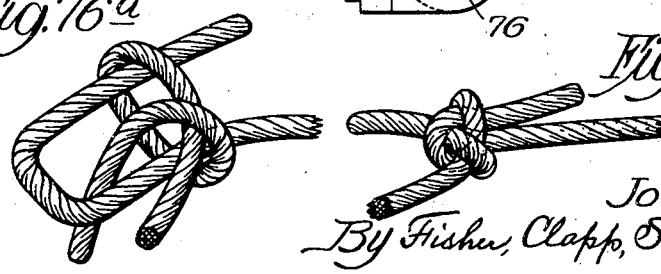

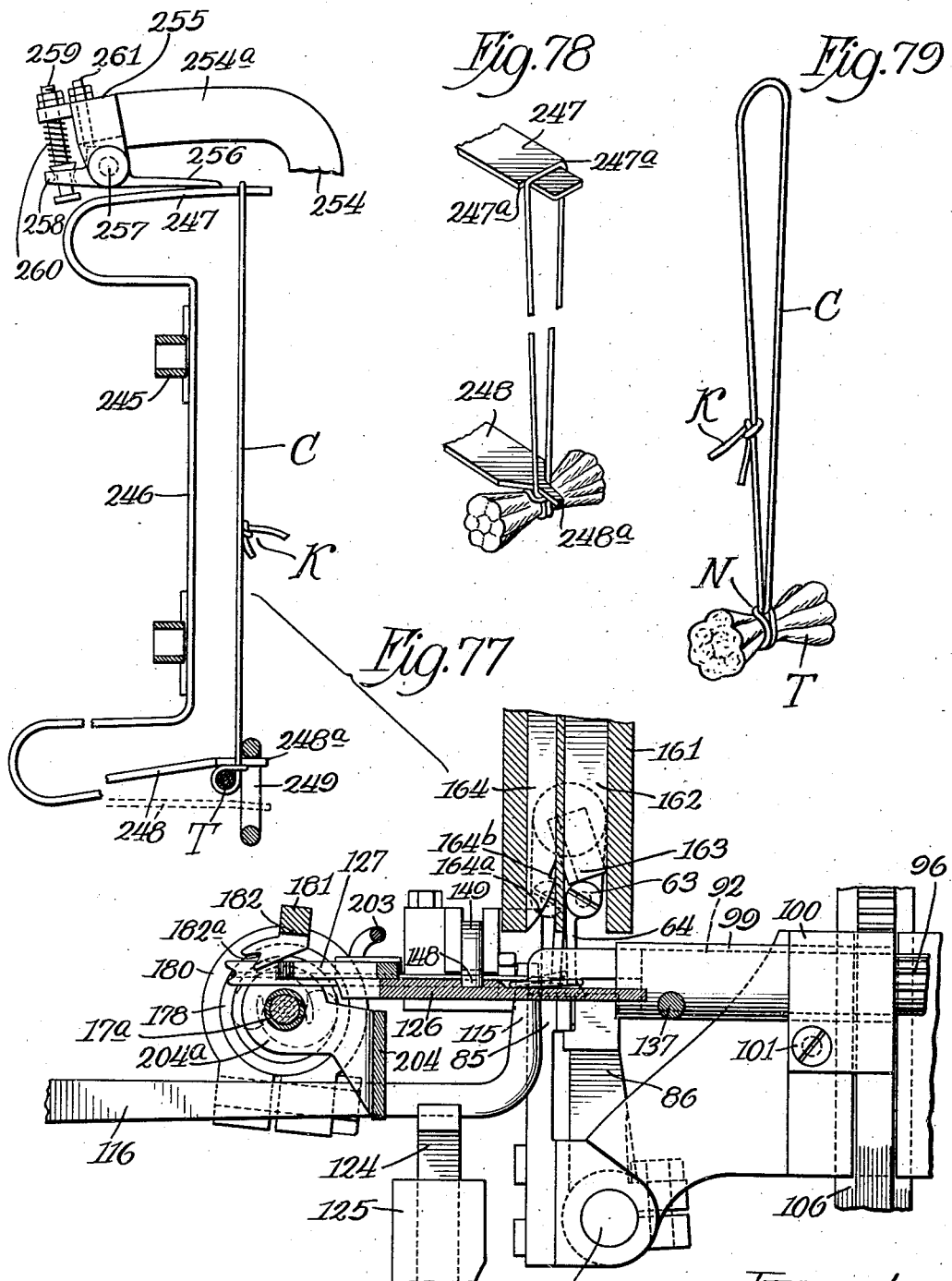

Patented Jan. 9, 1934

1,942,420

UNITED STATES PATENT OFFICE

1,942,420

MACHINE FOR ASSEMBLING MATTRESS TUFTS AND TUFTING-CORDS

John F. Gail, Evanston, Ill., assignor to Simmons Company, New York, N. Y., a corporation of Delaware Application July 9, 1930. Serial No. 466,779

43 Claims. (Cl. 28—2)

This invention relates to the general art of mattress manufacture, and has reference more particularly to the operation known as mattress tufting. A common and well known form of mattress tufting device comprises two wads, tufts or buttons and a tufting-cord connecting them and of a length considerably less than the uncompressed thickness of the mattress, whereby, when the device is applied to the mattress, the opposite sides of the mattress will be locally depressed or drawn inwardly. In an application heretofore filed by me on the 23rd day of February, 1928, Serial 256,104, relating to a tufted mattress and method of making the same, I have disclosed a form of tufting appliance consisting of a two-ply tufting-cord made as a continuous loop of twine, the free ends of the twine being connected to form the loop by a knot, and a pair of tufts consisting of short sections of a roll or twist of cotton that are passed through and gripped by nooses or slip-knots formed on the ends of the tufting-cord.

One object of the present invention has been to expedite and facilitate the work of tufting a mattress through the agency of an automatic machine operating upon a supply of tuft stock in the form of a continuous strand of cotton and a supply of cord or twine and functioning to successively form from the twine stock two-ply tufting-cords, cut them off from the supply stock, assemble one end of the tufting-cord with an end portion of the tuft stock by means of a noose or slip knot, sever the attached portion of the tuft stock, and then deliver the completed article, so that the operator in tufting the mattress has only to pass the tufting-cord through the mattress by means of a tufting tool, and then form a noose or slip-knot on the other end of the tufting-cord and pass the other tuft therethrough.

In the formation of the two-ply tufting-cord or loop, the advance end of the cord is first gripped, a sufficient length of cord is then drawn out to form the two-ply loop or tufting-cord, the end portion of the cord is then tied preferably by a weaver's knot to the drawn out portion, and the latter is then severed from the cord stock; and another object of the present invention has been to provide a simple and efficient loop and knot forming and knot-tightening mechanism.

Further objects of the invention have been to provide an improved mechanism for forming the noose or slip-knot on the tufting-cord which engages the tuft attached thereto by the machine; to provide improved means for successively advancing the tuft stock for engagement by the noose of the tufting-cord; to provide improved means for tightening the noose on the exposed section of the tuft stock; to provide improved means for successively severing the tufts from the tuft stock; and to provide improved means for rapidly discharging the completed article from the machine.

Still other objects and attendant advantages of the invention will be apparent to those skilled in the art from the following detailed description, taken in connection with the accompanying drawings wherein I have illustrated one practical and approved physical embodiment of the invention which in practice has been found to satisfactorily effectuate the above stated purposes and objects thereof, and in which—

Figs. 1 and 2 together show a front elevation of the machine, with the drive omitted.

Figs. 3 and 4 together constitute a vertical longitudinal section of the machine (omitting the drive) in the plane of the axis of the main cam shaft.

Fig. 5 is a plan section substantially on the line 5—5 of Figs. 1 and 2.

Fig. 6 is a vertical transverse section on the offset line 6—6 of Fig. 5.

Fig. 7 is a rear elevation of one end of the machine showing the drive, cord feeder, and cord-clamp actuating mechanism.

Fig. 8 is a development of the cam which operates the cord feeder.

Fig. 9 is a plan view of the cord feeder and cord clamp device and the operating mechanism of the latter, showing the clamp applied.

Fig. 10 is a view similar to Fig. 9 showing the cord clamp device released.

Fig. 11 is a transverse section on the line 11—11 of Fig. 10.

Fig. 12 is a transverse section on the line 12—12 of Fig. 10, also showing the operating cam and lever of the cord clamp device.

Fig. 13 is a vertical longitudinal section through the tuft twist feeding and guiding mechanism, showing also in edge elevation the cam which actuates a pair of noose-centering plates, and the cam which effects longitudinal movement of the tuft tube.

Fig. 14 is a vertical transverse section on the line 14—14 of Fig. 13.

Fig. 15 is a vertical transverse section on the line 15—15 of Fig. 13.

Fig. 16 is a horizontal longitudinal section through the tuft tube, noose-centering plates, and their actuating devices, the section being on line 16—16 of Fig. 13.

Fig. 17 is a view similar to Fig. 16, showing a retracted position of the tuft tube and its slide and a closed position of the noose-centering plates.

Fig. 18 is a group view of the two noose-centering plates.

Fig. 19 is a front elevation of a pair of upper and lower cord grippers and their operating parts, which function in the loop and knot forming operations.

Fig. 20 is a side elevation, viewed from the left of the parts shown in Fig. 19, in section through the cam shaft on the line 20—20 of Fig. 19, and showing the upper cord gripper in its cord-receiving position.

Fig. 21 is a view similar to Fig. 20, showing the upper cord gripper in its lowest position, wherein it delivers the cord to the lower gripper, and in section on the line 21—21 of Fig. 19.

Fig. 22 is a group view of the upper cord gripper and its actuating lever, the jaws of the gripper appearing in open position and the lever in a position corresponding thereto.

Fig. 23 is a group view of the parts shown in Fig. 22, showing the jaws of the gripper in closed position, and the actuating lever in a position corresponding thereto.

Fig. 24 is a plan view, partly in horizontal section, of the looper.

Fig. 25 is an elevation, partly in vertical section, of the looper and its operating mechanism.

Fig. 26 is a vertical section on the line 26—26 of Fig. 25.

Fig. 27 is a perspective detail of the looper including its operating pinion.

Fig. 28 is a fragmentary front elevation of a cooperating adjunct of the looper, and of the tuft twist cutter, and their operating devices.

Fig. 29 is a vertical section on the line 29—29 of Fig. 28.

Fig. 30 is a vertical section on the line 30—30 of Fig. 28.

Fig. 31 is a side elevation, in vertical section through the cam shaft, of a bight former mechanism that advances the cord loop to the noose-forming mechanism associated with the tuft tube.

Fig. 32 is an edge elevation, viewed from the right of the parts shown in Fig. 31.

Fig. 33 is a top plan view of the parts shown in Fig. 31.

Fig. 34 is a side elevation, in section through the cam shaft, of an adjustable cord draw-out device for determining the length of the tufting-cord, the cord engaging finger appearing in its lowermost position.

Fig. 35 is a front elevation of the mechanism shown in Fig. 34, viewed from the right of the latter.

Fig. 36 is a fragmentary view of the curved finger of the cord draw-out device shown in elevated position.

Fig. 37 is a front elevation of Fig. 36, viewed from the right of the latter figure.

Fig. 38 is a front elevation, partly in vertical section, of the noose former, centering plates and tuft gripper.

Fig. 39 is a vertical section on the line 39—39 of Fig. 38 showing the rack and pinion mechanism for actuating the noose former.

Fig. 40 is a fragmentary perspective detail of the bifurcated noose former.

Fig. 41 is a side elevation of mechanism which actuates the jaws of the tuft-gripper, in section through the cam shaft on the line 41—41 of Fig. 38.

Fig. 42 is a horizontal longitudinal section on the line 42—42 of Fig. 38.

Fig. 43 is a fragmentary longitudinal section through the forward end of the tuft tube, the centering plates, and the tuft gripper.

Figs. 44 and 45 are detail transverse sectional views through the jaws of the tuft gripper showing the latter in open and closed positions respectively the section being taken on the line 44—44 of Fig. 42.

Fig. 46 is a fragmentary perspective view of the tuft gripper jaws in open position and disassociated from their mounting.

Fig. 47 is a side elevation, in section through the cam shaft, of a hook mechanism that takes the loop from the noose former, draws it out to the required length, and tightens the noose on the tuft; said view indicating in dotted lines pause positions of the hook.

Fig. 48 is a front elevation of the parts appearing in Fig. 47.

Fig. 49 is a horizontal section of the same parts, taken on the line 49—49 of Fig. 47.

Fig. 50 is a side elevation, partly in vertical section, of a part of the knot tightening mechanism.

Fig. 51 is a vertical transverse section on the line 51—51 of Fig. 50.

Fig. 52 is a vertical transverse section on the line 52—52 of Fig. 50.

Fig. 53 is a side elevation, in vertical section through the bed plate and cam shaft, of a cord clamp that functions, as the cord loop is being drawn out, to locate the knot in one limb of the two-ply tufting-cord.

Fig. 54 is a front elevation, partly in longitudinal section on the line 54—54 of Fig. 53.

Fig. 54a is a fragmentary top plan view of Fig. 54, with parts omitted.

Fig. 55 is a front elevation of a transfer device and discharge conveyor for the finished article.

Fig. 56 is a side elevation, in section through certain shafts, viewed from the left of Fig. 55.

Fig. 57 is a vertical section through the cam shaft showing a pair of cams and operating connections for the transfer mechanism.

Fig. 58 is a fragmentary top plan view of the transfer arm and finger in association with the upper conveyor arm.

Fig. 59 is a vertical section through the upper end of the transfer arm and finger.

Fig. 60 is an elevation, in cross section through the cam shaft, of the cord severing mechanism, which functions after the knot has been tightened.

Fig. 61 is a front elevation, partly in vertical section on the line 61—61 of Fig. 60.

Figs. 62 and 63 are detail views of the cooperating parts of the cord cutter, illustrating preliminary and cutting positions of the knife.

Figure 2:
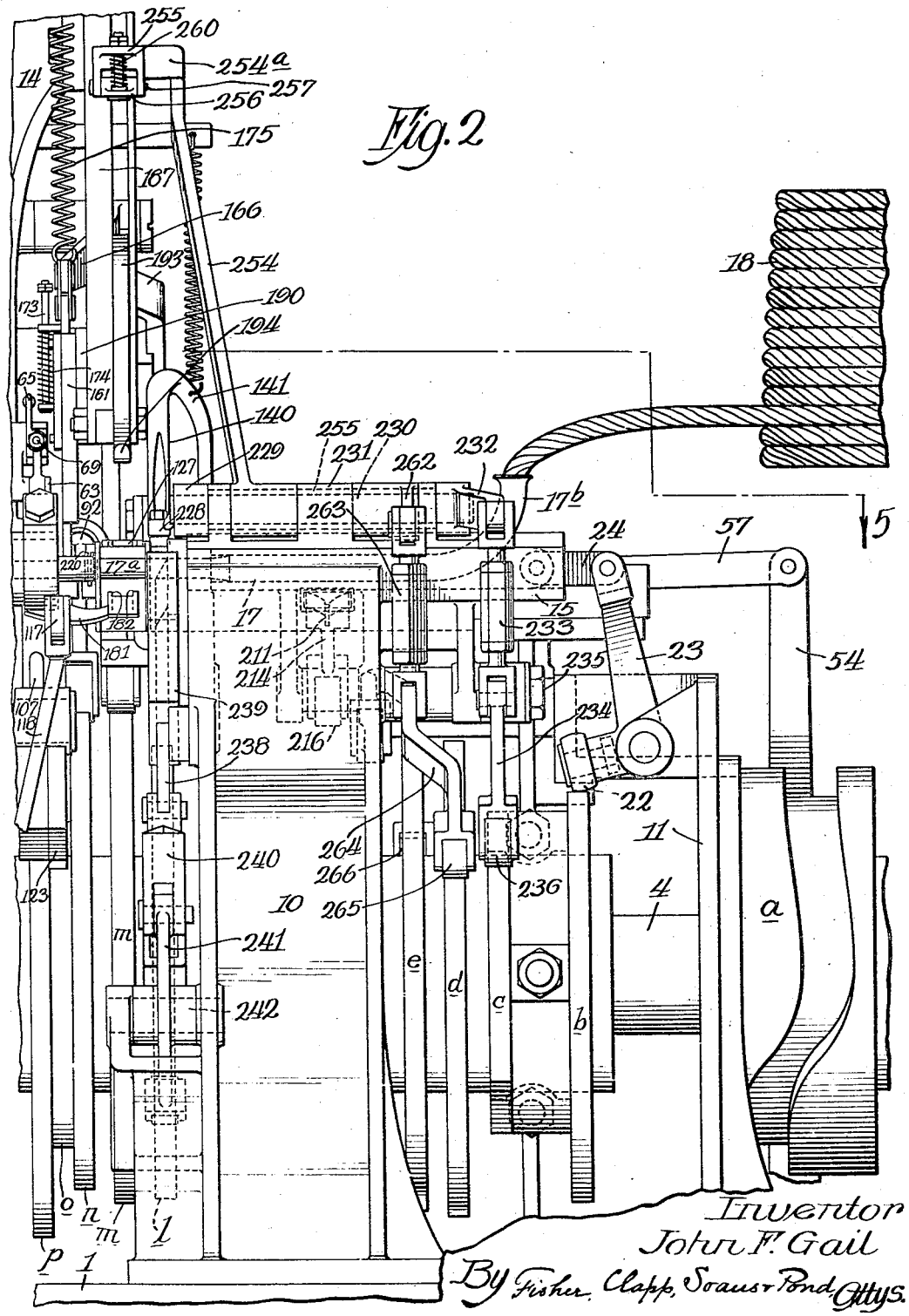

Figs. 64 to 71 inclusive are fragmentary plan views of the loop and knot forming and knot-tightening mechanism, illustrating the operations progressively; these views, with the exception of Fig. 67, also illustrating the noose-forming mechanism.

Fig. 72 is a vertical longitudinal section on the line 72—72 of Fig. 64.

Fig. 73 is a vertical longitudinal section on the line 73—73 of Fig. 65.

Fig. 74 is a vertical longitudinal section on the line 74—74 of Fig. 70.

Fig. 75 is a vertical transverse section on the line 75—75 of Fig. 70.

Fig. 76 is a vertical transverse section on line 76—76 of Fig. 71.

Fig. 76ᵃ is a perspective view of a weaver's knot as formed before being tightened.

Fig. 76ᵇ is a view of the same when drawn tight.

Fig. 77 is a transverse section similar to Fig. 76 showing the parts in a further advanced position, and also showing the tuft attached to the tufting-cord and the product placed on a delivery conveyor.

Fig. 78 is a perspective elevation, viewed from the right, of the conveyor portion of Fig. 77, showing the article transferred to the conveyor.

Fig. 79 is a perspective view of the completed article made by the machine.

Fig. 79 of the drawings shows the article made by the machine. Reference to said figure will show that the article comprises a two-ply tufting-cord C formed as a narrow loop with the ends of the cord tied together by a weaver's knot K located in one of the limbs of the loop, and a tuft T, in the instance shown consisting of a short section (in practice about an inch long) of a twisted strand of cotton; the tuft being attached to and held on the cord by a noose or slip-knot N. In describing the machine which produces these articles in rapid succession from a continuous supply of tuft stock and twine, I will first briefly outline the general features and organization of the machine, and will then describe in detail the various cooperating mechanisms which serve to draw out, tie and sever an appropriate length of twine to form the two-ply tufting-cord, advance and expose an appropriate length of tuft stock to form the tuft, loop the end of the tufting-cord around the tuft in the form of a slip-knot and then draw the tufting-cord and tuft out of the field of operation of the forming and assembling parts and deliver the article to a discharge conveyor.

General organization

Referring to the drawings, and more particularly to Figs. 1 to 7 inclusive, 1 designates a bed plate on which is mounted at one end a pillow block 2 (Fig. 1) and at the other end a gear casing 3, in and between which is journaled a longitudinally extending cam shaft 4, on which cam shaft are keyed a group of cams designated in order from right to left by $a, b, c, d, e, f, g, h, i, j, k, l, m, n, o, p, q, r, s, t, u, v, w, x$, and $y$, these cams, mainly in association with springs causing the cam followers to hug their respective cams, serving to operate the various moving parts of the machine. The cam shaft 4, in the instance shown, is continuously rotated from a source of power, such as a pulley 5 (Fig. 7) fast on a worm shaft 6, a worm 7 on shaft 6, and a worm wheel 8 on the shaft 4. Of course, any other suitable or desired drive for the cam shaft may be employed. On the front side of the machine are three main upright frames designated as entireties by 9, 10 and 11, and on the rear side of the machine are a pair of upright frames 12 and 13. These frame structures 9, 10, 11, 12 and 13 at their upper ends are supplied with suitable tables, platforms, and bearing blocks for many of the operative parts of the machine as hereinafter more fully described. Continuous with the rear frame member 12 is an upwardly extending beam 14 (Fig. 6) mainly forming a support for certain overhead parts through the agency of which the finished product is elevated and delivered to a discharge conveyor.

On these frame structures is mounted a group of cooperating mechanisms, comprising a tuft stock feed mechanism, a cord feed mechanism, a tufting cord-forming and knot-tying mechanism, a cord-severing device, a noose former mechanism, a noose tightening mechanism, a noose centering device, a tuft gripper, a device for locating the knot in one of the limbs of the two-ply tufting-cord, a tuft strand cutter, and an article transfer and discharge mechanism, all of which mechanisms I will now proceed to describe in the order named.

Tuft stock feed mechanism

Referring to Figs. 5 and 13 to 17 inclusive, on the upper end of the frame piece 10 is a longitudinally channeled block 15, in which is mounted a slide 16. Mounted in the slide 16 is a feed tube 17, formed with a slightly contracted feed end portion 17ᵃ and an upwardly curved rear end portion 17ᵇ, having a flaring mouth, through which is entered the strand of tuft stock drawn from a spindle or spool supply 18 (Fig. 2). The intermediate portion of the tube 17 is clamped in place by a filler block 19 (Figs. 13 and 14), over which is a cover plate 20 secured in place by screws 21. The slide 16 is actuated rearwardly by cam $b$, through a cam follower 22 (Fig. 13), elbow lever 23, and link 24, and on its forward movement by a pull spring 25 anchored at one end to lever 23 and at its other end to block 15. The cam $b$ turns in the direction indicated by the arrow in Fig. 15, and when the follower 22 is at the point marked $b'$ the tuft feed tube is at its extreme forward position indicated by dotted lines in Fig. 13. In traveling from point marked $b'$ to $b^2$ the tube 17 is slightly retracted to the position shown in Fig. 16 and remains in said position during the travel from $b^2$ to $b^3$. From $b^3$ to $b^4$, the tube is withdrawn to the position shown in Fig. 17, remaining withdrawn to position $b^5$, and between positions $b^5$ and $b'$ it is advanced again to its extreme forward position by spring 25. In priming the machine for operation, a strand of the tuft stock is drawn through the tuft tube, and a short length of the stock is allowed to project from the forward end of the tube for engagement by a tuft gripper prior to the backing off movement of the tuft tube, as hereinafter more particularly described.

Cord feed mechanism

Referring to Figs. 5 and 9 to 12 inclusive, on the upper end of the frame piece 13 is mounted a block 26 formed with a longitudinal dove-tail channel in which is mounted a slide 27. To the top plate of slide 27 is attached by screws 28 the stationary jaw 29 of a cord feeder, the movable jaw 30 of which is pivoted to the slide 27 by a pivot screw 31, and is formed with a tail piece 30ᵃ normally acted upon by a coil spring 32 and pin 33 to maintain the jaws 29 and 30 in the closed position shown in Fig. 10. Near their forward ends the jaws 29 and 30 are formed with opposed notches which, when the jaws are opened by the tail piece 30ᵃ riding over a stud 34 attached to the block 26, permits the passage therebetween of a cord gripper employed in the knot-forming operation, as hereinafter described. The pivoted jaw 30 is formed with a longitudinal hole or cord guide 30ᵇ through which the cord is threaded.

Mounted on the upper face of the slide 27 is a cord clamp which at times permits the cord to be drawn therethrough and at other times clamps the cord for the cord feeding movements and later for tightening the formed knot. This clamp comprises a fixed block 35 secured to the slide 27 by screws 36 passing through transverse slots in the block 35 to permit lateral adjustment of the latter, the outer edge of the block 35 being backed by screw studs 37 mounted in an abutment strip 38 secured on the slide 27. The inner edge of the block 35 is formed with a longitudinal cord groove 39, clearly shown in Fig. 11. Cooperating with the fixed block 35 is a movable block 40 formed with a central transverse slot through which extends a mounting screw 41; the block 40 being formed with a longitudinal tongue $40^a$ (Fig. 11) adapted to clamp the cord in the groove 39. The movable clamp block is actuated to clamping position by an eccentric 42 pivoted on a stud 43 screwed into the top plate of the slide 27; the eccentric 42 being formed with oppositely extending arms 44 and 45. To actuate the eccentric 42 and, through the latter, close and open the cord clamp, I employ striker mechanism comprising an elbow lever pivoted on a bearing stud 46 (Fig. 12) on the frame 13 and comprising a pair of divergent upwardly extending arms 47 and 48 carrying adjustable pins 49 and 50 respectively and a downwardly extending arm 51 carrying a follower 52 riding on the cam $e$. Since the clamp jaws 35 and 40 and their actuating eccentric 42 are bodily movable with the cord feeder, in one position (Fig. 9) the arm 45 lies in the path of the striker pin 49, and in another position (Fig. 10) the arm 44 lies in the path of the striker pin 50. Hence, in one position the eccentric arm 45 is actuated to clamp the cord and in another position the eccentric arm 44 is actuated to release the cord. A spring 53 (Figs. 9 and 10) maintains a slight pressure on the cord when the clamp is in release position.

Referring to Figs. 5 and 7, the slide 27 is actuated from the grooved cam $a$ through the agency of an upstanding lever 54 at its lower end pivoted at 55 to the bed plate of the machine, said lever having a cam follower 56 riding in the groove of the cam, and the upper end of the lever being connected to the slide by a link 57. Referring to Fig. 8 which is a development of cam $a$, while the cam follower is traveling through the portion $a'$ of the cam the feeder is at the starting position of its initial forward movement to deposit the end of the string in a gripper. As the follower 56 moves from the point $a'$ to point $a^2$, the cord feeder is advanced to the position shown in Fig. 64, and deposits the end of the cord in the upper cord gripper (hereinafter described); as it travels from the point $a^2$ to $a^3$, the cord feeder is fully retracted with the cord clamp released. As it travels from the point $a^3$ to the point $a^4$, the cord feeder is again advanced through the position shown in Fig. 69 to the fully advanced position shown in Fig. 70, and as the follower travels from the point $a^4$ to the point $a'$, the cord feeder is again retracted through the position shown in Fig. 71 to that shown in Figs. 66 and 68, corresponding to its starting position $a'$.

Tufting-cord forming and knot-tying mechanism

After the cord has been advanced by the cord feeder last described, a length of the cord is drawn out and folded into a loop, the two sides of the loop are tied together by a weaver's knot, and the cord is then severed beyond the knot. Describing the device by which these operations are performed, and referring first to Figs. 19 to 23 inclusive, 58 designates a lever arm, the hub 59 of which is journaled on a bearing stud 60 in the frame 12. On the free end of arm 58 is a bearing sleeve 61 formed with a depending bracket plate 62, in the lower end of which are mounted a pair of pivot studs 63. Pivoted on and depending from the studs 63 are a pair of jaws 64 forming parts of what I term the upper cord gripper. The jaws 64 are formed with upwardly extending arms 65 connected at their upper ends by a pull spring 66, the normal tendency of which is to spread the jaws 64. Journaled in the bearing sleeve 61 is a short shaft 67, fast on which is a cam 68 lying between and in the plane of the arms 65. This cam cooperates with adjustable studs 69 mounted in the arms 65 to spread the latter and thus close the jaws on a cord, as shown in Fig. 23. Keyed on a projecting end of a shaft 67 is a lever formed with an upstanding arm 70 and a depending arm 71. In the upper end of arm 70 is an adjustable tappet pin 72, and in the lower end of arm 71 is a similar adjustable tappet pin 73. Cooperating with the tappet pins 72 and 73 is an upstanding striker arm 74, the hub 75 of which is journaled on a short shaft 76 journaled in a frame lug $12^a$, and the upper portion of which is formed with upper and lower forwardly projecting fingers 77 and 78 adapted to respectively engage the tappet pins 72 and 73. The upper cord gripper is raised and lowered through the agency of a depending arm 79 fast on the hub 59, a cam follower 80 journaled in the lower end of arm 79, the cam $s$ on shaft 4, and a pull spring 81 that causes the follower 80 to hug the cam. The striker arm 74 is normally held retracted by a pull spring 82 and is moved forwardly on its working strokes by an arm 83 fast on hub 75, a cam follower 84 journaled in the lower end of arm 83, and the cam $r$. The normal position of the cord gripper and its jaw closing lever 70, 71 is that shown in Fig. 22, wherein the jaws 64 are normally open. When the arm 58 is in the raised position shown in Fig. 20, the striker finger 77 acting on the tappet pin 72 shifts the jaw closing lever 70, 71 to the position shown in Fig. 23, which rocks the shaft 67 and cam 68 to the position shown in Fig. 23, thereby closing the jaws 64 on the advance end of the cord. When the arm 58 is in its lowered position shown in Fig. 21, the striker finger 78 acts similarly on the tappet pin 73 to rock the lever 70, 71 and the cam 68 back to the positions shown in Fig. 22. The arm 58 is held in the position shown in Fig. 20 by relatively short and long protuberances $s'$ and $s^2$ on cam $s$, and between points $s'$ and $s^2$ is raised to elevate the gripper 64 to the position shown in Fig. 73. At a certain point in the operation the gripper is lowered to the position shown in Fig. 74 by a protuberance $s^3$ on the cam $s$, being returned to its highest position during travel of the follower 80 between protuberances $s^2$ and $s^3$ and $s^3$ and $s'$.

As the upper cord gripper 64 is lowered to the position shown in Figs. 70 and 74 through a loop of cord formed on the advanced end of the cord feeder, the free end of the cord is seized and held by a lower cord gripper. This latter comprises a fixed jaw 85 attached at its lower end to the frame lug $12^a$, and a cooperating swinging jaw 86 equipped at its upper end with an adjustable cord clamping tooth 87. The hub of the swinging jaw 86 is keyed to the shaft 76 (Fig. 21), and keyed on the opposite end of shaft 76 (Figs. 19 and 20) is the hub 88 of a depending arm 89, said arm carrying at its lower end a cam follower 90 that is actuated by the cam $u$. The follower 90 is caused to hug its cam $u$ by a pull spring 91 anchored at one end to the gripper jaw 86 and at its other end to the lug 12ª. The jaws of the lower gripper are normally open to receive the cord, and close on and hold the latter during the travel of the cam follower 90 over the cam protuberance u'. By reference to Fig. 19 it will be seen that the lower cord gripper is sufficiently offset from the upper cord gripper to permit the latter to descend and carry the projecting tip of the cord between the jaws of the lower gripper.

After the cord feeder has made its first advance movement and deposited the end of the cord into the grip of the upper cord gripper, the cord feeder clamp is released and the cord feeder backs off. The upper cord gripper now rises from the position shown in Fig. 72 to that shown in Fig. 73, and a transversely operating rotary looper then moves forward to engage the cord and form therein a loop shown in Figs. 68, 69 and 70, through which loop the cord is again carried on the next advance movement of the cord feeder as illustrated in Fig. 70. The details of this looper mechanism are best illustrated in Figs. 5, 24 to 27 inclusive, and 64 to 71 inclusive. The looper bar itself is shown in isolated detail in Fig. 27 and comprises a round bar designated as an entirety by 92. The forward portion of the bar is axially slotted as shown at 93 for the passage therethrough of the jaws of the cord feeder (Fig. 70), and somewhat rearwardly of its forward end the bar is transversely notched as shown at 94 to form a cord engaging hook 95. The rear portion of the looper bar has cut therein a wide pinion 96, and in rear of the pinion 96 the bar has a reduced portion 97 lying between collars 98 for engagement by a forked lever which effects the reciprocating movements of the looper bar. In one cheek of the looper bar hook 95 is formed a longitudinal cord groove 95ª, and in the other cheek at its outer end is formed a notch 95ᵇ; the function of the groove and notch being to maintain the opposite sides of the loop as it is formed substantially parallel. The looper bar is slidably mounted in a sleeve 99, said sleeve in turn being mounted in a split bracket 100 attached to the lug 12ᵇ on frame 12 and tightened by a clamp screw 101. Rearward sliding movement is imparted to the looper bar from the cam n by an elbow lever 102 (Fig. 25), one arm of which carries a cam follower 103 riding on the cam n, and the other end of which is forked to engage the outer reduced end 97 of the looper bar. The elbow lever is pivoted on a bearing stud 104 projecting from a frame lug 13ª, and a thrust spring 105 acting on the looper engaging arm of the lever effects forward endwise movement of the looper bar when permitted by the cam n.

The looper bar has not only a reciprocating movement as above described, but also a rotary movement through a three-fourths turn, to form the loop and present it in a position for the passage therethrough of the cord feeder on the second advance movement of the latter. The mechanism for effecting the turning movement of the looper bar is clearly shown in Figs. 24, 25 and 26, and comprises a vertically disposed rack bar 106 slidably mounted in the bracket 100 and engaging the pinion 96, a rack bar lifting lever 107 pivoted on a bearing stud 109 mounted on a post 10ª, a cam follower 110 riding on the cam p, and an adjustable lifter pin 111 in the free end of lever 107 engaged with a roller 112 on the lower end of rack bar 106. Encircling the upper portion of the rack bar, above the pinion 96, is a thrust spring 113 footed against a bracket 114 and acting on a collar 108 to urge the rack bar in a downward direction when permitted by the cam p.

At the beginning of a cycle, the looper is in the retracted position shown in Fig. 5, to be out of the path of the cord feeder. After the latter has advanced and deposited the end of the cord between the jaws of the upper cord gripper 64 as shown in Fig. 64, and has then backed off out of the path of the looper toward or to the position shown in Fig. 65, the upper cord gripper rises and the looper moves forwardly beneath the cord, thus laying the latter behind the hook 95 of the looper, as shown in Fig. 65. During this movement of the cord feeder, the cord feeder clamp is released, permitting the feeder to slide backwardly on the cord. At this point the looper is drawn rearwardly as shown in Fig. 66, and simultaneously the cord is drawn out by a transversely movable spreader pin on one side of the looper and a transversely moving bight former on the other side of the looper which carries a bight of the cord over into the zone of action of a noose former, later described. First describing the transversely moving spreader pin and its actuating mechanism and referring to Figs. 28 and 29, 115 designates the pin which is formed as an upwardly bent finger of an arm 116, which arm is pivoted at its other end at 117 on the upper end of a lever 118 that is pivoted at its lower end on a bearing stud 119 in a lateral lug 120 on the post 10ª and carries a cam follower 121 riding on the periphery of the cam q. The forward movement of the finger 115 is effected by the cam, and its backward movement is effected by a pull spring 122 anchored at one end to the arm 116 and at its other end to a bracket 123 on one of the frame members. By cam q the finger 115 is drawn forwardly from the position shown in Figs. 64 and 65 to that shown in Figs. 66, 67, 68 and 69, the finger being upheld in working position by the cam o acting on the lower end of a lifter pin 124 slidably mounted in a bearing 125 on the bracket 123; the lower end of the pin 124 riding on the cam o and its upper end underlying the arm 116. After the pin 115 has performed its function, it is permitted to drop by the cam o and return to its initial position out of the path of travel of the cord feeder, as the latter, on its second advance movement, passes through the loop formed on the looper, as shown in Fig. 70.

Describing now the bight former, and referring more particularly to Figs. 5, 31 to 33 inclusive, and 64 to 71 inclusive, 126 designates a horizontal plate that is mounted on the upper end of the frame 10. Slidable upon the plate 126 is a horizontal fork 127, the stem or shank 127ª of which is pivoted at its rear end at 128 to the upper end of a lever 129, which lever is pivoted intermediate its ends on a bearing stud 130 carried by a bracket 131 on the frame member 13. The lower end of lever 129 carries a follower 132 riding on the periphery of cam j. By this cam the fork 127 is projected forwardly on its bight-forming movement, its return travel being effected by a pull spring 133 (Fig. 31). The front end of the fork is transversely notched to engage with the cord, and by reference to Figs. 66 and 68 it will be seen that the advance travel of the fork 127 draws out a comparatively long bight of the cord through the cord feeder, the cord clamp of which is at this time released. As the loop former starts on its rearward movement from the position shown in Fig. 65, the spreader pin 115 and the bight former start on their forward movements, thus drawing out and flexing the cord to the form shown in Fig. 66. As the bight former advances from the position shown in Fig. 66 to that shown in Fig. 68, and then retreats to the position shown in Fig. 69, the looper 92 is turned through an angle of 270 degrees, its position at the end of a quarter turn being shown in Fig. 67, its position at the end of a half turn in Fig. 68, and at the end of a three-quarter turn in Fig. 69; in which latter figure it will be seen that a complete loop has been formed on the looper hook, which loop lies in the path of the next advance movement of the cord feeder.

When the bight former 127 has reached its fully advanced position illustrated in Fig. 68, the bight formed thereby is then transferred to a noose former which forms a noose or slip-knot in the bight of the cord around the tuft tube and during this operation of the noose former the cord feeder again advances from the position shown in Fig. 68 through the position shown in Fig. 69 to the position shown in Fig. 70, wherein it carries a loop of cord formed at its nose through the previously formed loop on the looper hook, and as it reaches the limit of its forward movement a lug 134 on the movable jaw 30 of the cord feeder dislodges the loop from the looper hook, as shown in Fig. 70. In this position of the parts the jaws of the cord feeder have been spread, and the upper thread gripper descends through the notches in the jaws and places the end of the thread between the jaws of the lower cord gripper. These latter jaws then grip the thread, and the upper jaws release it and rise out of the path of the cord feeder, thus leaving the end of the cord held by the lower gripper, as shown in Fig. 74. Since the cord feeder begins its second advance movement before the bight former has been fully retracted (as shown by Fig. 69), and since the paths of these two members intersect, it is necessary to slightly raise the bight former 127 during its return movement to clear the path of the cord feeder. This is done by mechanism illustrated in Figs. 31, 32 and 33, wherein the cam $k$ functions to raise an elbow lever 135 that is pivoted at 136 on the frame 10, the upper arm of said lever having a transverse pin 137 underlying the stem or shank 127$^a$ of the bight former. The cam $k$ is so timed as to raise the forked head of the bight former just before it reaches the path of movement of the cord feeder. The stem 127$^a$ is drawn downwardly by a pull spring 138 clearly shown in Fig. 31.

The advance movement of the bight former does not supply a sufficient length of cord to form the tufting cord for a mattress of average thickness, and to effect the drawing out of sufficient additional length of cord through the cord feeder I have provided a suitably timed cord extension or draw-out device, the details of which are shown mainly in Figs. 34 to 37 inclusive. Describing this device, in the plate 126 is formed a hole 139, movable through which is a cord engaging member preferably formed as a depending finger 140 on a lever arm 141. In the lower end of this finger is a transverse notch 142, best shown in Fig. 37, one side 140$^a$ of the notch being slightly longer than the other side 140$^b$. In the raised position of the finger 140 shown in Figs. 36 and 37, the wall 140$^a$ of the notch enters the hole 139, while the opposite wall 140$^b$ terminates above the hole, thus permitting the cord leading from the nose of the cord feeder to register with the notch 142 when the cord feeder is in the position shown in Figs. 66 and 68. The arm 141 is normally upheld by a pull spring 143, and is forced downwardly, as shown in Fig. 34, by the cam $h$ acting on a cam follower 144 journaled in one end of a lever 145, which lever is fulcrumed on a bearing stud 146 on the frame 13. To the other end of lever 145 is pivoted a lengthwise adjustable link 147, the upper end of which is pivoted to the arm 141. The advance movement of the bight former as shown in Figs. 66 and 68, carries the cord across the hole 139 and under the notch 142, as shown in Fig. 37. Just prior to the second advance movement of the cord feeder illustrated in Fig. 68, the cord extension finger 140 descends, drawing out a narrow vertical loop of cord, shown in Figs. 34 and 35, it being here noted that the convex side of the slightly curved finger 140 is preferably formed with a longitudinal groove 140$^c$ to accommodate one limb of the cord loop. A sufficient length of cord is thus drawn out at this point to supply the required length of two-ply tufting cord C shown in Fig. 79. To insure the release of the cord by the finger 140 when the latter rises, I have provided a stripper consisting of a block 140$^d$ attached to the top of the table 126 and formed with an apertured flange 140$^e$ overlying the hole 139 in the table; the aperture of the flange registering with the hole 139, for the passage of the finger 140 therethrough, and the flange being sufficiently elevated above the table 126 to permit the passage of the cord therebeneath. The finger 140 remains in its lowered position during the second forward and backward movements of the cord feeder shown in Figs. 70 and 71, during which second backward movement the cord clamp on the feeder is applied and the knot previously formed, is tightened as shown in Figs. 71 and 76$^b$.

During this knot tightening operation the free end of the cord is held by the lower cord gripper, while the opposed limb is held against yielding by the depressed finger 140. The actual tightening of the knot is effected by the backward pull of the cord feeder and by a pin 148 which simultaneously exerts a pull in the opposite direction on the left hand limb of the bight.

This knot tightening device and its actuating mechanism are shown in Figs. 50, 51 and 52, wherein it will be seen that the pin 148 is formed as a short downturned finger on the end of a horizontal arm 149. The finger 148 travels through a shallow groove 126$^a$ formed in the upper surface of the plate 126. The arm 149 is guided laterally in the upper horizontal limb of an inverted L-shaped box 150, bearing at one side against one wall of the box and at its other side against a block 151. It will be noticed that the forward end of the block 151 is beveled on its lower edge as shown at 151$^a$ in Fig. 50, so that as the cord is drawn back it is temporarily held by the beveled end of the block as the finger 148 rises to release the cord, thus insuring the separation of the finger and the cord. The finger is drawn rearwardly by the cam $y$ acting on a cam follower 152 on the lower end of an elbow lever 153, the upwardly extending arm of said lever being forked and pinned to a sleeve 154 slidable on the stem of the arm 149, the sleeve 154 being confined between a fixed collar 155 and a coil spring 156 on the stem of the arm, the spring 156 effecting a cushioned pull on the cord. The raising of the arm 149 and its finger 148 to release the cord is effected by the cam $v$ acting on a cam follower 157 in the lower end of a slide 158 in the depending limb of the box 150, the upper end of the slide 158 being equipped with a roller 159 for engagement with the lower edge of the arm 149 during the return movement of the latter.

Cord severing device

After the knot has been drawn tight by the opposite pulling movements of the cord feeder and the finger 148, last described, the cord is severed at a point slightly in advance of the nose of the cord feeder by a cutter, the details of which are shown principally in Figs. 60 to 63 inclusive; the relative location of this cord cutter also being shown in Figs. 6, 71 and 77. On a bracket pate 160 extending forwardly from the beam 14 is mounted a cutter casing 161, in which is mounted a vertically slidable cutter bar 162 having a cutter blade 163 attached thereto, and opposite the cutter bar 162 is slidably mounted a cooperating shear bar 164. The shear bar 164 is formed with a beveled inner edge 164$^a$ at its lower end, and, at the upper end of the beveled edge, with a cord receiving notch 164$^b$, as clearly shown in Figs. 62 and 63. The upper end of cutter bar 162 is connected by a link 165 to one end of an arm 166, which arm is pivoted at its other end on a bearing stud 167 on the beam 14. The cutter bar 162 is actuated on its descending or cutting movement from cam $m$, said cam engaging a cam follower 168 on a lever 169 fulcrumed at 170, the other end of said lever being connected by a pull rod 171 to an intermediate point on the arm 166. The shear bar 164 is forced downwardly simultaneously with the cutter bar 162 through a cushioned connection to the latter comprising a lateral lug 172 on the upper end of shear bar 164 projecting through a slot 161$^a$ in the casing 161, a guide rod 173 mounted at its upper end in a lug 162$^a$ on the cutter bar 162 and at its lower end in the lug 172, and a thrust spring 174 encircling the rod 173 and confined endwise between lugs 162$^a$ and 172. The cutter and shear bars are elevated after the cord cutting operation by a pull spring 175 (Fig. 6). The lug 172 through contact with the lower end of slot 161$^a$ positively limits the downward movement of the shear bar 164 at the point indicated in Figs. 62 and 63. At this point, the cord has been guided by the beveled edge 164$^a$ into the notch 164$^b$, as shown in Fig. 62. Further downward movement of the cutter bar 162 to the position shown in Fig. 63 idly compresses the spring 174 and severs the cord.

Noose former mechanism

Reference has heretofore been made to a noose former, this being a device that takes the closed end of the cord bight from the bight former, winds it around the tuft feeder tube, and delivers it to a noose tightener that, after the tuft tube has backed off exposing a section of the tuft strand, draws the noose tight on the latter. This noose former mechanism is best shown in Figs. 38, 39, 40 and 42, its relative location and mode of operation being also shown in Figs. 5, 64 to 66 inclusive, 68 to 71 inclusive, and 75 to 77 inclusive. Keyed in a bearing block 176 on the upper end of frame piece 9 is a shaft 177, on the projecting portion of which is a rotatable sleeve or tubular shaft 178 carrying a pinion 179. On one end of sleeve 178 is a collar 180 carrying an arm 181 extending beyond the end of the sleeve and terminating in a pair of laterally projecting fingers 182, that overhang the forward end of the tuft feed tube 17 when the latter is in its advanced position. The ends of fingers 182 are formed with cord-engaging notches 182$^a$ (Fig. 40). Sleeve 178 is oscillated by cam $t$ through a quadrant rack 183 pivoted on a bearing stud 184 and equipped with a cam follower 185 and an internal segment gear 186 meshing with pinion 179. By reference to Fig. 39 it will be observed that cam $t$ has a low section $t'$ by which the fingers 182 are held above the path of the cord bight on the end of the advancing bight former (Figs. 66, 68 and 77), a low protuberance $t^2$ by which the bight is picked off the bight former by the fingers (Fig. 69), and a high protuberance $t^3$ by which the fingers carrying the bight are swung around beneath the tuft feed tube (Figs. 70 and 75).

Noose tightening mechanism

As the noose former reaches the limit of its working stroke, carrying the closed end of the bight to the position indicated in Fig. 75, the closed end of the bight is picked up by a vertically reciprocating hook which raises the closed end of the bight between the longitudinal limbs of the latter and draws the noose around the tuft feed tube, as illustrated in Fig. 76, until, just before the noose is drawn tight, the tuft tube is backed off exposing a section of the tuft, on which the final tightening of the noose is effected, the projecting end of the tuft being held by a tuft gripper, hereinafter described, as the noose is tightened thereon.

Describing this noose tightener, and referring more particularly to Figs. 47, 48, 49 and 55 to 59 inclusive, attached to the upper end of the beam 14 is a depending arcuate plate 187, and parallel therewith and spaced therefrom is a cooperating guard plate 188, said plates being connected at their lower ends by a bolt 189 which also passes through a horizontal brace bar 190, this latter being attached at its inner end to a lug 14$^d$ on the beam 14. On the rear of beam 14 is a transverse bearing 191, in which is journaled a rock shaft 192. Keyed on one end of shaft 192 is an arm 193, the forward portion of which lies between and is guided by the arcuate guide plates 187, 188; the forwardly projecting portion of said arm 193 hanging downwardly, as shown in Fig. 47, and terminating in an upturned hook 194 which, as the arm rises, picks the closed end of the bight off the notched fingers of the noose former and draws it upwardly, as shown in Figs. 75 and 76. Arm 193 is actuated on its upward or working stroke from cam $w$, the periphery of said cam being engaged by a cam follower 195 on one arm of a T-shaped lever 196, the stem of which lever is fulcrumed on a bearing stud 197 projecting from an angle bar 198 attached to the frame piece 12. On the other arm of lever 196 is formed a longitudinally slotted inclined bearing member 199 which receives a horizontal pin 200$^a$ in the lower end of a lengthwise adjustable link 200; the position of the pin 200$^a$ in its bearing member 199 being determined by an adjusting screw 201. The upper end of link 200 is pivoted to an arm 202 keyed on the other end of rock shaft 192. From this it will be seen that rotation of the cam $w$ counterclockwise from the position shown in Fig. 47 effects an upward swing of arm 193. By turning the adjusting screw 201, the length of a stroke of the hook 194 may be nicely adjusted, while by shortening or lengthening the link 200, the lower and upper positions of the hook 194 may be nicely adjusted.

The upward or working stroke of the hook 194 is not continuous but, as shown by the irregular surface of the cam $w$, includes brief dwells indicated at $d'$, $d^2$ and $d^3$ in Fig. 47; the dwell at $d'$ occurring at the instant of the twine cut-off operation, the dwell at $d^2$ occurring as the noose is withdrawn from the tuft tube onto the tuft, and the dwell at $d^3$ occurring at the instant the tuft is severed from the strand. $d^4$ indicates the extreme upper limit of travel of the hook 194, and $d^5$ indicates a subsequent slightly lowered position of the hook wherein the upper closed end of the cord loop is deposited on a pivoted finger, as shown in Fig. 59, by which it is transferred to a delivery conveyor, later described. To prevent the trailing portion of the tie cord, from flying upwardly and possibly being caught by the hook 194 as the latter rises, I provide a guard in the form of a bowed wire 203 which is so mounted as to overlie and straddle the trailing sides of the loop just rearwardly of the path of movement of the hook 194.

Noose centering device

To narrow and center the noose as it is drawn around the tuft tube, I preferably employ a device best shown as to its details in Figs. 13, 14, 16, 17 and 18. Describing this device, 204 and 205 designate a pair of flat strips that are slidably mounted side by side in a longitudinal guide channel 206 formed in a side wall of the block 15 and are confined by a cover plate 207. The strips 204 and 205 are formed with rectangularly bent extensions 204a and 205a, respectively, that are formed with registering apertures through which the reduced forward portion 17a of the tuft tube 17 passes. The extensions 204a and 205a are normally drawn together, as shown in Fig. 17, by a pull spring 208 anchored at its ends to studs 209 and 210 secured in the strips 204 and 205 respectively, said studs extending through slots in the cover plate 207. During the noose forming and drawing operations the extensions 204a and 205a are held apart by a wedge 211, which is forced inwardly through slots 212 and 213 in the strips 204 and 205, respectively, by cam $g$, acting on a lever 214 (Fig. 14), pivoted on a stud 215 on the frame piece 10. The wedge 211 is mounted on the upper arm of the lever 214 while the lower arm of said lever carries a follower 216 riding on the periphery of the cam. In the operation, just before the tuft tube is retracted to expose a section of the tuft strand, the wedge 211 is withdrawn, and the spring 208 acts to draw the sides of the noose together and center it on the tuft tube, the centered noose being confined between the arms of the centering device and by the latter centered on the tuft itself. Just before the tuft shearing operation, the wedge 211 again opens the centering device permitting the tuft to be withdrawn from between the clamps of the centering device.

Tuft gripper

After the tuft tube has completed its advance movement, with a short section of the tuft strand projecting therefrom, said projecting end of the tuft strand is seized and held by a tuft gripper which prevents the strand accompanying the retracting movement of the tuft tube. The details of this tuft gripper and its operating mechanism are best shown in Figs. 38, 39, 41 to 46 inclusive, 64, 65, 66, 68, 69, 70 and 71. By reference to Figs. 39 and 42 it will be seen that the stationary shaft 177 is formed with parallel bores in which are journaled a pair of shafts 217 and 218. On the forward ends of these shafts are formed oppositely facing and inwardly extending curved jaws, shaft 217 having a single jaw 219, and shaft 218 having a pair of spaced jaws 220 respectively disposed in planes on opposite sides of jaw 219, as shown in Fig. 43. With this arrangement of gripper jaws, a slight turning movement of shafts 217 and 218 in one direction closes the jaws on the tuft strand, as shown in Figs. 43 and 45, and a like movement in the opposite direction opens the jaws, as shown in Figs. 44 and 46.

The jaws are opened to permit the advance end of the strand to pass between them by cam $x$ acting on a lever 221 which is pivoted at 222 on the frame 9. The lower arm of lever 221 has a follower 223 riding on the cam $x$ and its upper arm has a segment rack 224 meshing with a pair of segment gears 225 and 226 fast on the shafts 217 and 218, respectively. Lever 221 is drawn in a direction to close the jaws by a pull spring 227. In the position of the cam $x$ shown in Fig. 41, the spring 227 has just closed the jaws on the tuft strand, and the latter is held by the jaws until the tuft cutter has operated and the tuft is is about to be drawn upwardly.

Knot locating device

When the machine was first operated, it was found that when the noose was drawn tight on the tuft, the knot in the cord appeared in the noose. This was unsightly, and accordingly a device was added to insure the presence of the knot in one of the limbs of the tie cord, as shown in Fig. 79, where the knot is concealed in the body of the mattress after the tufting device has been applied to the latter. This knot locating device consists of a finger which, as the noose is being drawn, presses down on one limb of the cord loop, so that, as the hook 194 rises, the knot K is drawn through the noose and up into one of the side limbs of the tufting cord. The details of this device are shown in Figs. 53, 54 and 54a, and its relative location appears on the plan views, Figs. 5 and 64 to 71 inclusive. 228 designates the clamp finger, the same being mounted in the free end of an arm 229, which arm is keyed on one end of a rock shaft 230 that is journaled in a bearing 231 on the frame piece 10. On the other end of shaft 230 is keyed a forwardly extending arm 232 that is connected by a lengthwise adjustable link 233 to a lever 234 pivoted at one end on a bearing stud 235 on the frame piece 10. The lower end of lever 234 carries a follower 236 that rides on the periphery of cam $c$. As the hook 194 starts to rise, the finger 228 descends onto one limb of the cord and clamps it on the plate 126, so that as the hook rises, the cord is drawn from the opposite side, thus drawing the knot through the noose and up into one limb; the finger 228 being released at about the position of the cord shown in Fig. 64.

Tuft strand cutter

The noose having been transferred from the tuft tube to the tuft strand by the noose centering strips upon the retraction of the tuft tube, and drawn tight on the strand, the latter is then severed by a shearing mechanism best shown in Figs. 6, 28 and 30, its relative location in the machine also being shown in Figs. 5 and 13 and the detail plan views, Figs. 64 to 71 inclusive. Attached to one end of the block 15 is a shear block 237 apertured in line with the tuft tube for the passage of the latter, and cooperating with said shear block is an endwise movable knife 238 slidably mounted in a guide 239. The lower end of knife blade 238 is connected by an adjustable link 240 to the upper arm of a lever 241, which lever is pivoted on a bearing stud 242 on the frame piece 10. Upper and lower cam followers 243 and 244 on opposite sides of the pivot of lever 241 cooperate with the cam 1; the cam protuberance acting on the lower follower 244 to effect the working stroke of the cutter, and then acting on the upper follower 243 to effect the return stroke of the cutter.

*Article transfer and discharge mechanism*

From the hook 194 the finished article, shown in Fig. 79 is, by a transfer mechanism, placed on a discharge conveyor that is mounted opposite the front of the machine and has an intermittent or step-by-step movement to successively receive and deliver the finished articles. The details of the transfer mechanism are best shown in Figs. 1, 2, 5, 6, 55 to 59 inclusive, and 77 and 78. Referring to Figs. 6, 56 and 77, 245 designates as an entirety a horizontally traveling discharge conveyor mounted and operated (by means not shown) to travel step-by-step past the front of the machine. This conveyor includes a plurality of vertically disposed steel strips 246 spaced one step apart, each of said strips being bent or bowed at its upper and lower ends to present upper and lower resilient article engaging arms 247 and 248. By reference to Fig. 78, it will be observed that the tip end of arm 247 is reduced in width, thus providing stop shoulders 247$^a$, and the lower arm 248 is formed on its free end with a central finger 248$^a$. The normal positions of the arms 247 and 248, when not engaging the article, are shown in Fig. 6, and their positions when carrying the article are shown in Figs. 77 and 78; the dotted line position of the lower arm 248 in Fig. 77 being the same as the position shown in Fig. 6.

Referring now to the transfer mechanism, and first describing the device by which the lower end of the cord carrying the tuft is engaged with the finger 248$^a$ of the lower arm 248 (as shown in Figs. 77 and 78), by reference to Fig. 6 it will be seen that as the hook 194 rises pulling up the cord, it just clears the tip of the finger 248$^a$, but due to the arcuate movement of the hook the two limbs of the cord are respectively carried across the sides of the finger 248$^a$ during approximately the first quarter of the upward movement of the hook. As soon as the limbs of the cord have thus been registered with the finger 248$^a$, they are pushed further onto the finger, and there held during the remainder of the upward movement of the cord, by a paddle 249 formed on the upper end of an arm 250. As shown in Figs. 55 and 56, the paddle 249 has an opening therein of sufficient size to pass over the free end of the conveyor arm 248. The arm 250 is formed on a lever arm 251 that is pivoted on a bearing stud 252 on the frame 10 and at its free end carries a follower 253 riding on the periphery of the cam $i$. After the limbs of the cord have been registered with the finger 248$^a$ on the rising movement of the cord, the cam $i$ acts to swing the paddle 249 forwardly to the position shown in Figs. 56 and 77, thereby pushing the cord fully onto the finger. The paddle 249 retains this position until the cord and tuft are fully raised, as shown in Fig. 56, bringing the tuft directly beneath the finger 248$^a$, and until the upper end of the cord has been transferred onto the upper arm 247 of the conveyor. At the highest position $d^4$ of the hook 194, shown in Fig. 56, the cord has flexed the lower arm 248 upwardly from its normal position, so that the cord is under tension.

Describing next the mechanism for transferring the upper end of the tufting cord from the hook 194 onto the upper arm 247 of the conveyor, this is effected through the agency of a forwardly swinging transfer arm carrying at its upper end a spring controlled finger which receives the upper end of the cord loop from the hook 194, transfers it onto the conveyor arm 247, and returns without dislodging the cord loop from the arm. 254 designates the transfer arm which, at its lower end, is keyed on a tubular shaft 255 encircling the shaft 230, as shown in Fig. 54. The upper end of arm 254 has a forwardly and laterally bent extension 254$^a$ terminating in a head 255. The lower portion of the head 255 is bifurcated to receive a transfer finger 256 pivoted on a horizontal pin 257. As shown in Fig. 58, the finger 256 has a pointed end, and an opening for the passage of the hook 194 therethrough. On the hub of the finger is a forwardly projecting lug 258 (Fig. 59) through which and the tip of the head 255 extends a bolt 259 encircled by a thrust spring 260 normally tilting the finger 256 upwardly. The downward swing of finger 256 under the pull of the tufting cord is limited by a stop screw 261 in the head 255 abutting against a shoulder on the hub of the finger (Fig. 59).

Briefly describing at this point the operation, when the arm 254 and finger 256 are in the forward and intermediate positions (represented by the dotted positions of the finger shown in Fig. 56) the hook 194 draws the tufting cord up to the position shown in Fig. 56. As soon as this position is reached, the arm and finger swing rearwardly, the pointed end of the finger passing between the limbs of the cord so that the latter straddles the finger as shown in Fig. 59. The hook 194 then descends to its $d^5$ position, depositing the bight of the cord on the finger, as shown in Fig. 59. The finger then makes a slight advance movement, bringing the hook to the relative position shown by dotted lines in Fig. 59, wherein the cord has cleared the path of the hook. As the finger makes an instantaneous pause at this time, the hook is again elevated clear of the finger, and the finger then advances carrying the bight of the cord with it onto the shouldered end of the conveyor arm 247. As the cord strikes the shoulder 247$^a$, as shown in Fig. 58, it can follow the finger no further, and the continued advance movement of the finger retracts the latter from beneath the cord, whereupon the spring 260 tilts the finger upwardly above the cord, so that the transfer arm and its finger return to initial position shown in Fig. 56, leaving the upper loop of the cord on the upper conveyor arm 247. In this position, shown in Fig. 78, both arms 247 and 248 of the conveyor are slightly sprung toward each other, so that the cord is held under tension on the conveyor. As the loaded conveyor travels away from the machine, the completed articles are readily stripped off by an attendant.

Describing the operating mechanism of the transfer arm 254, 262 (Fig. 56) designates a forwardly projecting arm keyed on the tubular shaft 255. The free end of arm 262 is connected by an adjustable link 263 to one arm 264 of a yoke that is pivoted centrally on the bearing stud 252, the arm 264 having a follower 265 riding on the periphery of cam d. The other arm 264ª of the yoke carries a follower 266 riding on the periphery of cam f. The contours of the cams d and f are so formed as to rock the yoke in a manner to impart the requisite swinging movements to the transfer arm 254 to effect the transfer of the tufting cord to the conveyor as above described.

Operation

The operation of the machine has, to a considerable extent, already been indicated in connection with the descriptions of the various cooperating mechanisms; but a complete cycle may be briefly outlined as follows.

Assuming that the cord feeder and the tuft feeder have both been threaded, the cord clamp is applied and the cord feeder advances and puts the advance end of the cord between the upper jaws, which latter are then closed on the cord a slight distance behind its forward end, as shown in Fig. 64. The cord feeder clamp is then released, and the cord feeder backs off. The upper jaws now rise with the end of the cord (Fig. 73) and the rotary looper moves forward to receive the cord behind its grooved lugs or hooks (Figs. 65 and 73). The looper then backs, and at the same time the spreader pin 115 moves forwardly, giving a horizontal S form to the cord. The bight former pushes forward a U-shaped bight of the cord (Fig. 66), the cord feeder at the same time backing off further to the positions shown in Figs. 66 and 68; and at the same time the looper rotates 270 degrees through the positions shown in Figs. 67 and 68 to the position shown in Fig. 69, and thus puts a loop in a vertical plane lying across the line of cord feed. When the parts are in substantially the relative positions illustrated in Fig. 68, the cord draw-out finger 140 descends to draw out of the feeder the requisite length of cord to form the two-ply tufting cord. At about this time, the tuft feeder advances and deposits the projecting end of the tufe strand between the tuft gripper jaws which instantly close on the strand, this position of the tuft feeder being shown in Figs. 68 and 69. The cord feeder then advances a second time with its cord clamp released, and pushes a horizontal loop through the vertical loop on the looper and then dislodges the vertical loop from the looper, as shown in Fig. 70. This second advance movement of the cord feeder carries the horizontal loop thereon beneath the cord end in the upper jaws. The feeder jaws open during this second advance movement, and the upper gripper jaws move downwardly between them, as shown in Fig. 74, and deliver the end of the cord to the lower jaws, and the upper jaws are then opened to release the cord, and then return to up position. While this is taking place, the noose former is carrying the forwardly projected bight around the tuft tube and delivering the bight to the vertically reciprocating draw-out hook 194. As the cord feeder makes its second return movement with its cord clamp applied, the hook 148 moves in the opposite direction, thus drawing the knot tight, as shown in Fig. 71, the cord being still held in the lower jaws. The cord cutter then cuts the cord off somewhat in advance of the nose of the cord feeder, and the instant this is done, the lower jaws release the free end of the cord.

The draw-out hook 194 pauses as the cord cutter acts, but immediately thereafter rises and draws the cord upwardly to form the slip knot around the tuft tube, as shown in Fig. 76. When the loop has been drawn out approximately to the extent shown in Fig. 64, the knot locating clamp 228 descends on one limb of the loop, and the further upward pull of the hook 194 draws the knot in the cord up into one limb of the loop as shown in Fig. 79. Just before the noose or slip-knot has been formed on the tuft tube, the noose centering devices 182 move toward each other, thus narrowing and centering the noose, and, at the same time the tuft tube backs away, as shown in Fig. 65, thus allowing the noose to be drawn tight on the exposed section of the tuft strand. At this instant the draw-out hook 194 pauses, and the strand cutter acts to sever a tuft length of strand. The noose centering arms 182 then spread, and during the final part of the upward movement of the draw-out hook 194 the tuft is lifted, and the completed article is then engaged with the delivery conveyor in the manner already described.

As soon as the cord has been severed, and the cord released by the lower cord gripper, the cord feeder returns to its starting position and then advances on another cycle while the previously formed tufting cord is being looped around the tuft tube and tuft and the finished article transferred to the conveyor, so that successive cycles overlap, as shown in Figs. 64 and 65.

The movements of the several cooperating mechanisms are, of course, accurately synchronized so as to effect rapid continuous and uninterrupted operation of the machine. Manifestly, many of the mechanical details herein shown and described may be variously modified without involving any departure from the underlying principles of the apparatus or sacrificing any of the advantages thereof, and the term "tuft", as used in the specification and claims, is intended to include any functionally similar device, such as a button formed with a cord engaging part or member. Hence, believing myself to be the first to design a complete organized automatic machine for assembling a tuft and tufting cord substantially in the manner described, I do not limit the invention to the mechanical details shown for purposes of illustration, but reserve all such variations, modifications and mechanical equivalents as fall within the spirit and purview of the claims.

I claim:

1. In a tuft and cord assembling machine, the combination of a tuft feeder, a cord feeder, means for forming a two-ply loop of cord having a closed end, and means for attaching the closed end of said loop to a tuft.

2. In a tuft and cord assembling machine, the combination of a tuft feeder, a cord feeder, means for forming a two-ply loop of cord having a closed end, and means for forming a slip knot at the closed end of said loop around a tuft.

3. In a tuft and cord assembling machine, the combination of a tuft feeder, a cord feeder, means for forming a two-ply loop of cord having a closed end, and means for inter-linking the closed end of said loop with a tuft.

4. In a tuft and cord assembling machine, the combination of a tuft feeder, means for feeding a continuous length of cord, mechanism for drawing out from said feeding means a fixed length of cord, knot tying mechanism for connecting the free end of said cord to the latter to thereby form a two-ply cord loop, means for forming a slip knot at one end of said loop around a tuft, and means for severing said cord behind the knot.

5. In a tuft and cord assembling machine, the combination of means for feeding a continuous strand of tuft stock, means for feeding a continuous length of cord, mechanism for drawing out from said feeding means a fixed length of cord, knot tying mechanism for connecting the free end of said cord to the latter to thereby form a two-ply cord loop, means for forming a slip knot at one end of said loop around the advance end portion of said tuft stock, means for severing said cord behind the knot, and means for severing said tuft stock behind said slip knot.

6. In a tuft and cord assembling machine, the combination of a tuft feeder, a cord feeder, means for forming a two-ply loop of cord, a noose former operative to draw one end of said loop around a tuft, and mechanism operative to draw said closed end outwardly between the limbs of the loop to thereby form and tighten a slip knot around said tuft.

7. In a tuft and cord assembling machine, the combination of a tuft feeder, a cord feeder, means for forming a two-ply loop of cord, a noose former operative to draw one end of said loop around a tuft, mechanism functioning to draw said closed end outwardly between the limbs of the loop, to thereby form and tighten a slip knot around said tuft, and means for discharging the assembled tuft and tie cord from the machine.

8. In a tuft and cord assembling machine, the combination of a tuft feeder, a cord feeder, means for forming a two-ply loop of cord, a noose former operative to draw one end of said loop around a tuft, mechanism functioning to draw said closed end outwardly between the limbs of the loop to thereby form and tighten a slip knot around said tuft, a discharge conveyor, and transfer mechanism functioning to deliver the assembled tuft and tie cord to said conveyor.

9. In a tuft and cord assembling machine, the combination of a tuft feeding mechanism, a cord feeding mechanism, mechanism for forming a two-ply loop of cord, mechanism operative to carry one end of said loop around a tuft in the form of a slip knot, mechanism for drawing said slip knot tight on said tuft, a cam shaft, a group of cams on said shaft, and mechanism respectively controlled by said cams respectively actuating the above-named mechanisms in synchronized relation.

10. In a tuft and cord assembling machine, the combination of mechanism for feeding a continuous length of tuft stock, mechanism for feeding a continuous length of cord, mechanism, including a knot-tying mechanism, for forming a two-ply loop of cord, mechanism operative to carry one end of a loop around a tuft in the form of a slip knot, mechanism for drawing said slip knot tight on said tuft, a cord severing mechanism, a tuft severing mechanism, a cam shaft, a group of cams on said shaft, and mechanisms respectively controlled by said cams respectively actuating the above-named mechanisms in synchronized relation.

11. In a tuft and cord assembling machine, mechanism for intermittently feeding a strand of tuft stock to a position to receive a tie cord, comprising a slide, a tube carrying the strand mounted on said slide, and means for reciprocating said slide; in combination with mechanism for gripping the forward end of the strand and holding the same during the backing-off movement of said slide, and mechanism for passing the closed end of a folded two-ply tie cord in the form of a slip knot around the advance end portion of said strand.

12. In a tuft and cord assembling machine, mechanism for intermittently feeding a strand of tuft stock to a position to receive a tie cord, comprising a slide, a tube carrying the strand mounted on said slide, and means for reciprocating said slide; in combination with a gripper seizing the forward end of the strand and holding the same during the backing-off movement of said slide, and mechanism for passing the closed end of a folded two-ply tie cord in the form of a slip knot around the advance end portion of said tube prior to the backing-off movement of said slide.

13. In a tuft and cord assembling machine, mechanism for intermittently feeding a strand of tuft stock to a position to receive a tie cord, comprising a slide, a tube carrying the strand mounted on said slide, and means for reciprocating said slide; in combination with a gripper seizing the forward end of the strand and holding the same during the backing-off movement of said slide, mechanism for passing one end of a two-ply tie cord in the form of a slip knot around the advance end portion of said tube prior to the backing-off movement of said slide, and mechanism for centering the slip knot on said tube.

14. In a tuft and cord assembling machine, a reciprocating tube for intermittently feeding a strand of tuft stock to a position to receive a tie cord therearound, in combination with a gripper mechanism serving to seize the advance end of the strand and hold the same during the backing-off movement of said tube, said gripper mechanism comprising a pair of shafts, oppositely extending jaws on the forward ends of said shafts respectively, and means for simultaneously rocking said shaft to effect opening and closing movements of said jaws.

15. In a tuft and cord assembling machine, the combination of a reciprocating tube for intermittently feeding a strand of tuft stock, mechanism for passing one end of a two-ply tie cord around the advance end of said tube in the form of a slip knot, and mechanism for centering said slip knot on said tube comprising a pair of oppositely moving slides embracing the forward portion of said tube in the cord-receiving position of the latter, means holding said slides apart during the slip knot forming operation, and means for closing said slides on a formed slip knot.

16. In a tuft and cord assembling machine, the combination of a reciprocating tube for intermittently feeding a strand of tuft stock, mechanism for passing one end of a two-ply tie cord around the advance end of said tube in the form of a slip knot, and centering mechanism for said slip knot comprising a pair of oppositely moving slides embracing the forward portion of said tube in the cord-receiving position of the latter, a spring urging said slides toward each other, a wedge forcing said slides apart, and mechanism for retracting said wedge.

17. In a tuft and cord assembling machine, the combination of a block, a slide mounted on said block, a tuft strand feed tube mounted on said slide, mechanism for passing one end of a two-ply tie cord around the advance end of said tube in the form of a slip knot, and mechanism for centering said slip knot on said tube comprising a pair of oppositely moving plates slidably mounted on said block parallel with said feed tube and formed with bent extensions apertured for the passage of the feed tube therethrough, a spring normally drawing said extensions toward each other, and mechanism for holding said extensions apart during the forming of the slip knot therebetween.

18. In a tuft and cord assembling machine, the combination of a block, a slide mounted on said block, a tuft strand feed tube mounted on said slide, mechanism for passing one end of a two-ply tie cord around the advance end of said tube in the form of a slip knot, and mechanism for centering said slip knot on said tube comprising a pair of oppositely moving plates slidably mounted on said block parallel with said feed tube, said plates being formed with endwise overlapping slots and with rectangularly bent extensions apertured for the passage of the feed tube therethrough, a spring urging said extensions toward each other, a wedge movable through said slots to force said extensions apart, and mechanism for advancing and retracting said wedge.

19. In a tuft and cord assembling machine, the combination with a reciprocating tube carrying a strand of tuft stock, and a cord bight former reciprocating at right angles to said tube, of a noose former mounted to oscillate around said tube and formed with a notched finger adapted to pick the cord bight off said bight former and wrap it around said tube.

20. In a tuft and cord assembling machine, the combination with a reciprocating tube carrying a strand of tuft stock, and a cord bight former reciprocating at right angles to said tube, of a noose former comprising a shaft, an arm mounted on said shaft, a notched finger on said arm adapted to pick the cord bight off said bight former and wrap it around said tube, and means for oscillating said shaft.

21. In a tuft and cord assembling machine, the combination with a reciprocating tube carrying a strand of tuft stock, and a cord bight former reciprocating at right angles to said tube, of a noose former comprising a shaft mounted coaxially with said tube, an arm projecting from one end of said shaft, a notched finger on said arm adapted to pick the cord bight off said bight former and wrap it around said tube, and means for oscillating said shaft.

22. In a machine for attaching a two-ply tufting cord to a tuft, the combination of a reciprocating tube carrying a strand of tuft stock, a cord bight former reciprocating at right angles to said tube, a noose former mounted to oscillate around said tube and operating to pick the cord bight off said bight former and wrap it around said tube, and a noose tightener operating to pick the bight off said noose former and draw the same outwardly between the limbs of said tufting cord.

23. In a machine for attaching a two-ply tufting cord to a tuft, the combination of a reciprocating tube carrying a strand of tuft stock, a cord bight former reciprocating at right angles to said tube, a noose former mounted to oscillate around said tube and operating to pick the cord bight off said bight former and wrap it around said tube, and a noose tightener comprising a reciprocating arm terminating in a hook operative to pick the bight off said noose former and draw the same outwardly between the limbs of said tie cord.

24. In a machine of the character described, the combination of a reciprocating tube functioning to feed a continuous strand of tuft stock, a tuft gripper functioning to seize the advance end of the strand at each forward movement of said tube and hold the same during the retracting movement of said tube to thereby expose a section of tuft stock, means for looping a closed end portion of a two-ply tufting cord around said section in the form of a slip knot, means for tightening said slip knot, and means for severing said section from the strand at the end of the knot tightening operation.

25. In a machine of the character described, a loop-forming and knot-tying mechanism, comprising, in combination, a reciprocating cord feeder, a bodily movable cord-gripper adapted to receive the advance end of a cord from said feeder, a looper functioning to form a loop in the cord across the path of travel of said feeder after the first backward movement of the latter, said feeder on its second advance movement carrying a loop of cord through the loop on said looper and said cord gripper then carrying the end of the cord through the loop carried by said feeder, a second cord gripper receiving the end of the cord from said movable gripper, and means cooperating with said feeder on the second backward movement of the latter to tighten the knot.

26. In a machine of the character described, a loop-forming and knot-tying mechanism, comprising, in combination, a reciprocating cord feeder, a bodily movable cord gripper adapted to receive the advance end of a cord from said feeder, an oscillating looper movable across the path of travel of said feeder and functioning to form a loop in the cord after the first backward movement of said feeder, said feeder on its second advance movement carrying a loop of cord through the loop on said looper and said cord gripper then carrying the end of the cord through the loop carried by said feeder, a second cord gripper receiving the end of the cord from said movable gripper, and means engaging the cord on the opposite side of the knot from said feeder and cooperating with the latter to tighten the knot.

27. In a machine of the character described, a loop-forming and knot-tying mechanism, comprising, in combination, a reciprocating cord feeder, a movable cord gripper adapted to receive the advance end of a cord from said feeder, an oscillating looper movable across the path of travel of said feeder and functioning to form thereon a loop in the cord after the first backward movement of said feeder, said feeder on its second advance movement carrying a loop of cord through the loop on said looper, and said cord gripper then carrying the end of the cord through the loop carried by said feeder, means on said feeder for dislodging the loop from said looper, a second cord gripper receiving the end of the cord from said movable gripper, and a reciprocating pin engaging the cord on the opposite side of the knot from said feeder and cooperating with the latter to tighten the knot.

28. In a loop-forming and knot-tying mechanism, the combination of a reciprocating cord feeder formed with a longitudinal cord guide, a cord gripper adapted to receive and hold the advance end of a cord from said feeder, a cord clamp mounted on said feeder, and automatic mechanism for actuating said clamp between cord clamping and release positions.

29. In a loop-forming and knot-tying mechanism, the combination of a reciprocating cord feeder formed with a longitudinal guide groove for the cord, a cord gripper adapted to receive and hold the advance end of a cord from said feeder, a slidable cord clamp mounted on said feeder having a tongue engageable with said groove, and automatic mechanism for actuating said clamp between cord-clamping and release positions.

30. In a loop-forming and knot-tying mechanism, the combination of a reciprocating cord feeder formed with a longitudinal guide groove for the cord, a cord gripper adapted to receive and hold the advance end of the cord from said feeder, a slidable cord clamp mounted on said feeder having a tongue engageable with said groove, an operating cam for said clamp, and automatic mechanism for actuating said cam.

31. In a loop-forming and knot-tying mechanism, the combination of a reciprocating cord feeder comprising a slide, relatively pivoted loop-forming jaws on said slide, one of said jaws having a longitudinal hole for the passage of the cord therethrough, a spring normally maintaining said jaws closed, and means for opening said jaws during the advance movement of said slide; and a cord gripper movable between said jaws in the open position of the latter.

32. In a loop-forming and knot-tying mechanism, the combination of a reciprocating cord feeder comprising a slide, cooperating fixed and pivoted loop-forming jaws on said slide, said pivoted jaw having a longitudinal hole for the passage of the cord therethrough, a spring normally maintaining said jaws closed, and means for opening said jaws during the advance movement of said slide; and a cord gripper movable between said jaws in the open position of the latter.

33. In a loop-forming and knot-tying mechanism, the combination with a channeled block, of a reciprocating cord feeder comprising a slide mounted on said block, cooperating fixed and pivoted loop forming jaws on said slide, said pivoted jaw having a longitudinal hole for the passage of the cord therethrough and both of said jaws being notched on their adjacent edges, a spring normally maintaining said jaws closed, a stud on said block and a tail piece on said pivoted jaw cooperating with said stud to open said jaws during the advance movement of said slide; and a cord gripper movable through the notches of said jaws in the open position of the latter.

34. In a loop-forming and knot-tying mechanism, the combination of a reciprocating cord feeder, a cord gripper adapted to seize and hold the end of the cord on the advance movement of said feeder, and means for drawing out a length of cord from said feeder comprising an apertured plate supporting the cord between said feeder and gripper and a member reciprocable through the aperture of said plate and formed with a cord-engaging notch in one end thereof.

35. In a loop-forming and knot-tying mechanism, the combination of a reciprocating cord feeder, a cord gripper adapted to seize and hold the end of the cord on the advance movement of said feeder, and means for drawing out a length of cord from said feeder comprising an apertured plate supporting the cord between said feeder and gripper, a pivoted arm, a finger on said arm reciprocable through the aperture of said plate and formed with a cord-engaging notch in its free end, and means for oscillating said arm.

36. In a loop-forming and knot-tying mechanism, the combination of a reciprocating cord feeder, a cord gripper adapted to seize and hold the end of the cord on the advance movement of said feeder, and means for drawing out a length of cord from said feeder comprising an apertured plate supporting the cord between said feeder and gripper, a pivoted arm, a finger on said arm reciprocable through the aperture of said plate and formed with a cord-engaging notch in its free end, said notch being formed with relatively long and short sides, the former of which normally lies in said aperture while the latter lies above it, thereby permitting the cord to be drawn into register with said aperture and notch, and means for oscillating said arm.

37. In a machine of the character described, a cord cutting mechanism comprising a supporting bracket, a cutter bar slidably mounted in said bracket, a cooperating shear bar slidably mounted in said bracket and formed with a cord-seating notch in the edge thereof adjacent to the cutting edge of said cutter bar, means for reciprocating said cutter bar, a driving connection between said cutter bar and said shear bar, and a stop limiting the travel of said shear bar; said driving connection permitting continued movement of said cutter bar after the movement of said shear bar has been arrested.

38. In a machine of the character described, a cord cutting mechanism comprising a supporting bracket, a cutter bar slidably mounted in said bracket, a cooperating shear bar slidably mounted in said bracket and formed with a cord-seating notch in the edge thereof adjacent to the cutting edge of said cutter bar, means for reciprocating said cutter bar, a spring driving connection between said cutter bar and said shear bar, and a stop limiting the travel of said shear bar; said spring driving connection permitting movement of said cutter bar after the movement of said shear bar has been arrested.

39. In a machine of the character described, the combination of mechanism for tying the ends of a tufting cord together to form a two-ply loop, mechanism for passing one end of said loop around a tuft in the form of a slip knot, mechanism for drawing out said loop to tighten the slip knot on said tuft, and mechanism for locating the knot of the loop in a side limb of the latter during the drawing-out operation.

40. In a machine of the character described, the combination of mechanism for tying the ends of a tufting cord together to form a two-ply loop, mechanism for passing one end of said loop around a tuft in the form of a slip knot, mechanism for drawing out said loop to tighten the slip knot on said tuft, and a clamp engaging one side of said loop during the drawing-out operation whereby to locate the knot of the loop in a side limb of the latter.

41. In a tuft and cord assembling machine, the combination with mechanism for forming a two-ply tufting cord, and mechanism for looping one end of said cord around a tuft, of a delivery conveyor formed with upper and lower arms relatively resiliently flexible toward and from each other, mechanism operative to pass the lower end of said tufting cord beneath said lower arm, and mechanism operative to transfer the upper end of said cord onto said upper arm.

42. In a tuft and cord assembling machine, the combination with mechanism for forming a two-ply tufting cord, and mechanism for looping one end of said cord around a tuft, of a delivery conveyor formed with an upper arm and a lower arm resiliently flexible toward and from said upper arm, mechanism for elevating said cord to a position opposite said conveyor, mechanism operative to pass the lower end of said tufting cord beneath said lower arm, and transfer mechanism operative to pass the upper end of said cord onto said upper arm.

43. In a tuft and cord assembling machine, the combination with mechanism for forming a two-ply tufting cord, and mechanism for looping one end of said cord around a tuft, of a delivery conveyor formed with upper and lower arms resiliently flexible toward and from each other, a vertically reciprocating hook operating to draw said cord and attached tuft upwardly, a paddle functioning to push the lower end of said cord and attached tuft beneath said lower arm, and transfer mechanism receiving the upper end of said cord from said hook and carrying the same onto said upper arm.

JOHN F. GAIL.